US010634579B1

(12) United States Patent
Woodbury et al.

(10) Patent No.: US 10,634,579 B1
(45) Date of Patent: Apr. 28, 2020

(54) METHODS AND APPARATUS FOR DETECTING POSITION OF A LIQUID

(71) Applicant: Hill-Rom Services, Inc., Batesville, IN (US)

(72) Inventors: Brian C. Woodbury, Gilbert, AZ (US); Roc Lastinger, Cave Creek, AZ (US)

(73) Assignee: Hill-Rom Services, Inc., Batesville, IN (US)

( * ) Notice: Subject to any disclaimer, the term of this patent is extended or adjusted under 35 U.S.C. 154(b) by 21 days.

(21) Appl. No.: 15/983,075

(22) Filed: May 17, 2018

Related U.S. Application Data

(63) Continuation of application No. 14/827,285, filed on Aug. 15, 2015, now abandoned, which is a continuation-in-part of application No. 14/327,882, filed on Jul. 10, 2014, now Pat. No. 9,719,951.

(60) Provisional application No. 61/845,459, filed on Jul. 12, 2013, provisional application No. 62/081,662, filed on Nov. 19, 2014.

(51) Int. Cl.
*G01R 31/00* (2006.01)
*G01M 3/40* (2006.01)
*G01N 27/06* (2006.01)

(52) U.S. Cl.
CPC .............. *G01M 3/40* (2013.01); *G01N 27/06* (2013.01)

(58) Field of Classification Search
USPC .................. 324/699, 716; 73/335.02–335.05
See application file for complete search history.

(56) References Cited

U.S. PATENT DOCUMENTS

| | | | |
|---|---|---|---|
| 2,737,615 A | 3/1956 | Roby | |
| 3,145,567 A | 8/1964 | Bobrowsky | |
| 4,319,232 A | 3/1982 | Westphal | |
| 4,338,546 A * | 7/1982 | Ehret | G01F 23/243 315/119 |
| 4,350,968 A | 9/1982 | Tokarz | |
| 4,386,231 A | 5/1983 | Vokey | |
| 4,411,155 A | 10/1983 | Coulange | |
| 4,594,638 A | 6/1986 | Suzuki | |
| 4,677,371 A | 6/1987 | Imaizumi | |
| 4,928,513 A | 5/1990 | Sugihara | |
| 5,220,514 A | 6/1993 | John | |
| 5,235,286 A | 8/1993 | Masia | |
| 5,275,044 A | 1/1994 | Riley | |
| 5,570,030 A | 10/1996 | Wightman | |
| 5,698,083 A | 12/1997 | Glass | |
| 6,175,310 B1 | 1/2001 | Gott | |
| 6,787,718 B2 | 9/2004 | Andberg | |
| 7,292,155 B2 | 11/2007 | Vokey | |
| 7,688,215 B2 | 3/2010 | Vokey | |
| 2002/0149380 A1 * | 10/2002 | Sato | G01F 23/363 324/699 |
| 2005/0165369 A1 | 7/2005 | Hodge | |

(Continued)

*Primary Examiner* — Vincent Q Nguyen
(74) *Attorney, Agent, or Firm* — Barnes & Thornburg LLP

(57) ABSTRACT

Methods and apparatus for detecting moisture that includes at least three conductors. One of the conductors has a different resistance than the other conductors. A liquid extends between the conductors. The difference between the impedance through a pair of conductors and the liquid and the impedance of through another pair of conductors and the liquid may be used to determine the position of the liquid along a length of the conductors. Similar methods may be used to determine an area of a liquid with respect to the conductors.

11 Claims, 9 Drawing Sheets

(56) References Cited

U.S. PATENT DOCUMENTS

| | | |
|---|---|---|
| 2005/0225335 A1 | 10/2005 | Filipkowski |
| 2005/0255724 A1 | 11/2005 | Picco |
| 2009/0158819 A1 | 6/2009 | Vincent |
| 2009/0218223 A1 | 9/2009 | Manaresi |
| 2010/0127848 A1 | 5/2010 | Mustapha |
| 2010/0176827 A1 | 7/2010 | Yamazaki |
| 2010/0241094 A1 | 9/2010 | Sherron |
| 2010/0319435 A1 | 12/2010 | Strong |
| 2011/0179861 A1 | 7/2011 | Grange |
| 2012/0251859 A1 | 10/2012 | Payne |
| 2013/0075018 A1 | 3/2013 | Heppe |

\* cited by examiner

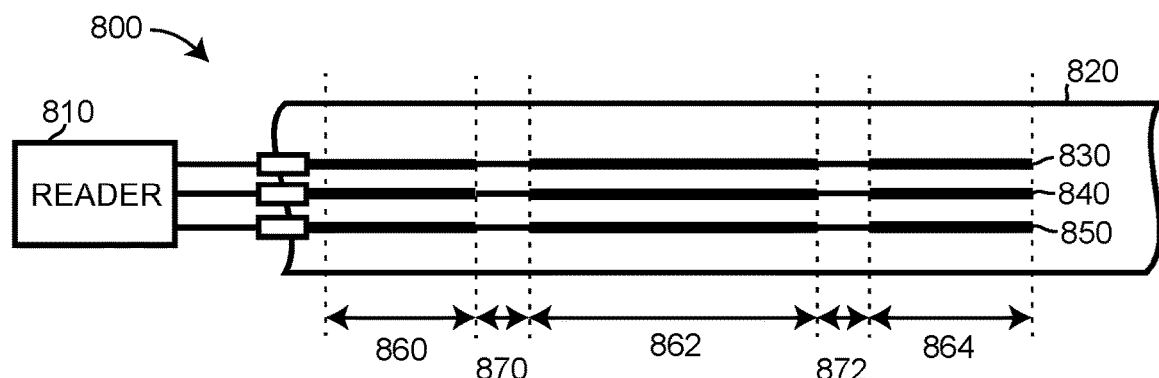
FIG. 8
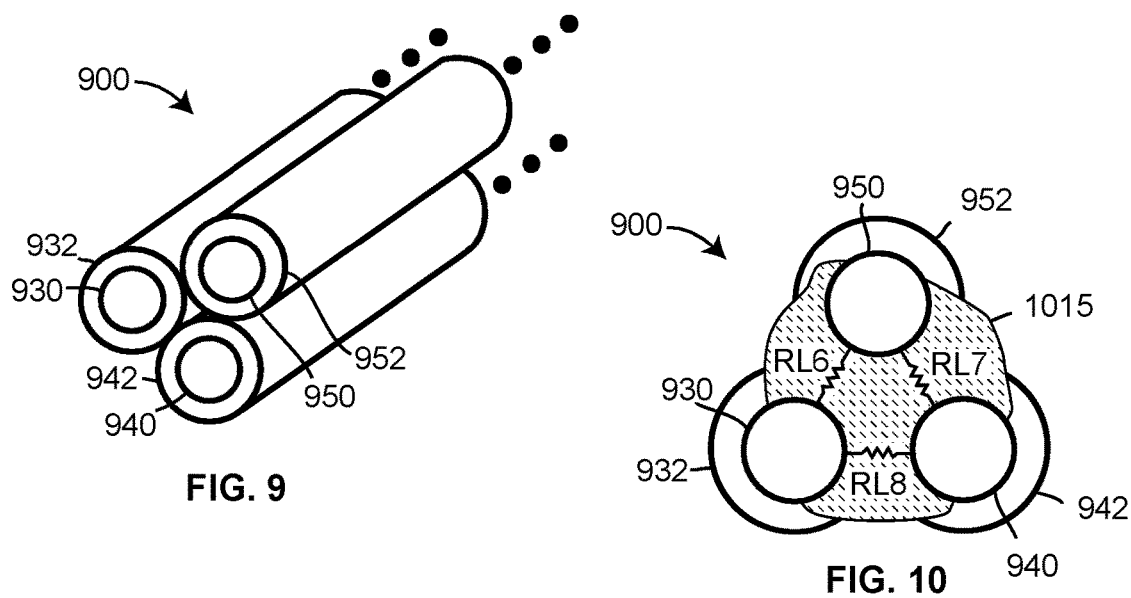
FIG. 9
FIG. 10
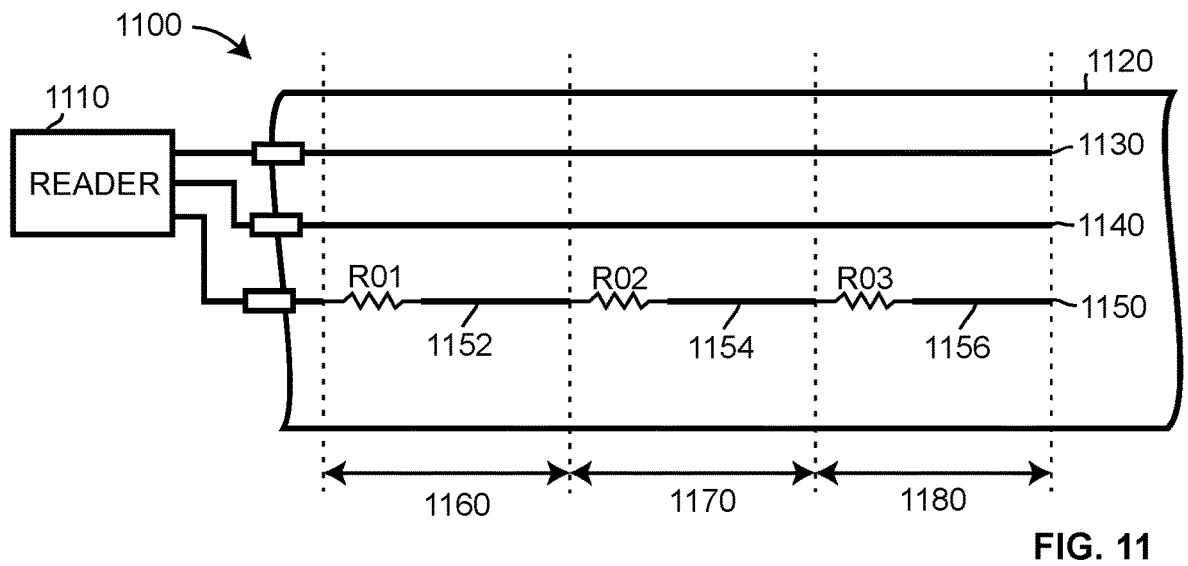
FIG. 11

METHODS AND APPARATUS FOR DETECTING POSITION OF A LIQUID

FIELD OF THE INVENTION

Embodiments of the present invention relate to moisture sensors and processing circuits related to moisture sensors.

BACKGROUND OF THE INVENTION

Previous moisture detection systems, utilized two closely spaced conductors (e.g., conductive elements, wires). When a conductive liquid (e.g., water, salt water, water with minerals, urine, blood, body fluid) is present, an electrical circuit (e.g., connection, path, electrical coupling) between two conductors may be established and may be detected by a reader (e.g., circuit, detector).

The impedance through the liquid can vary widely due to factors that include conductor spacing, amount of liquid (e.g., moisture), and chemical content of the liquid.

The variation in the impedance through the liquid may reduce the accuracy of detecting a position (e.g., length, distance, location) of the liquid with respect to the conductor. Detecting moisture may benefit from improvements in reducing the effect of variation in the impedance of a liquid on accuracy, detecting the location of the liquid, and detecting an area of the liquid.

BRIEF DESCRIPTION OF THE DRAWING

FIG. 8 is a top plan view of another implementation of a moisture detector according to various aspects of the present invention;

FIG. 9 is a perspective plan view of another implementation of a substrate and conductors of a moisture detector according to various aspects of the present invention;

FIG. 10 is a side view plan the substrate and conductors FIG. 9 in the presence of moisture;

FIG. 11 is a top plan view of another implementation of a moisture detector that includes zones according to various aspects of the present invention;

DETAILED DESCRIPTION OF THE PREFERRED EMBODIMENTS

Figure 1:
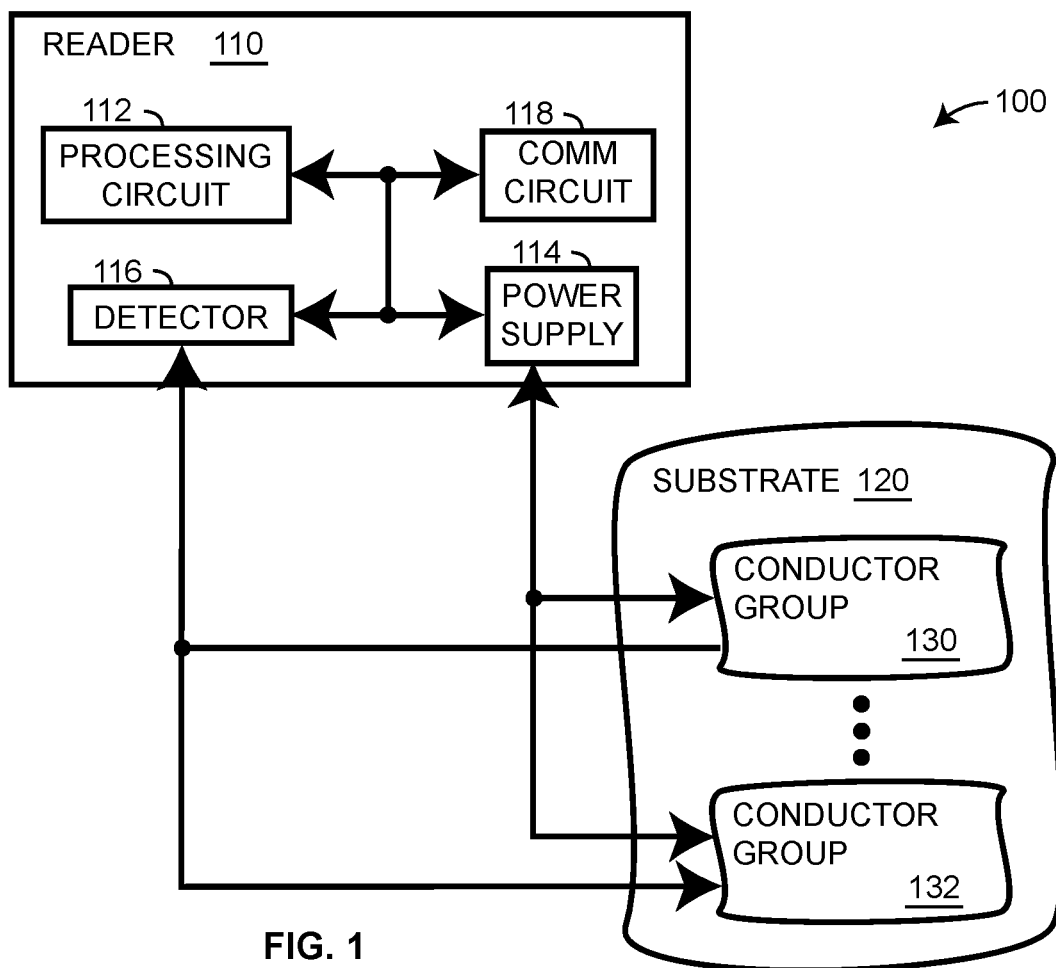
FIG. 1 is a functional diagram of a moisture detector in accordance with various aspects of the present invention.

U.S. provisional patent application No. 61/845,459 filed Jul. 12, 2013; U.S. patent application Ser. No. 14/327,882 filed Jul. 10, 2014; and U.S. provisional patent application No. 62/081,662 filed Nov. 19, 2014 are herein incorporated by references so that their respective disclosures may be used for any purpose in the present application.

A moisture detector may detect the presence of moisture (e.g., liquid, vapor). A moisture detector may detect a position of moisture relative to the structure of the moisture detector. A moisture detector may detect an area (e.g., spread, extend) of moisture.

Moisture detector 100 may include reader 110, substrate 120, and conductor groups 130-132. A conductor group may include three or more conductors as discussed below. Conductors groups may operate independently of each other or cooperate to detect a presence of moisture, a location of moisture, and/or an area of moisture as discussed below. A reader may include processing circuit 112 and a power supply 114. A reader may further include detectors 116. The function of detectors 116 may be performed in whole or in part by processing circuit 112. A reader may further include communication ("comm") circuit 118.

According to various aspects of the present invention, a moisture detector includes at least three conductors that cooperate to detect the presence of a liquid, determine the location of the liquid with respect to the conductors and/or the substrate, and/or determine the amount of area, relative to the conductors and/or the substrate, that is covered by the liquid.

A conductor may be formed of any conductive material. Conductive material may include a metal and/or semi-conductive (e.g., semi-conductor) material. The structure (e.g., form, form factor) of a conductor may include any conventional structure of a conductor. Structures of a conductor may include the form of a conventional wire, a thin-film conductor, a thick-film conductor, and a deposited (e.g., printed, formed by deposition) conductive material.

A conductor may have an impedance (e.g., resistance). The impedance of a conductor may include the bulk resistivity of the material of the conductor (e.g., p, rho), sheet resistance of the material of the conductor, and a total resistance of the conductor.

Conductors whose impedance include a sheet resistance may have a width, a thickness, a length, and a bulk resistivity p (e.g., rho). Sheet resistance Rs is defined as the resistivity p divided by the thickness of the conductor. Sheet resistance is expressed as $\Omega/\square$ (e.g., ohms/square, ohms per square). In equation form, Rs is:

$$Rs = \rho/t, \text{ where} \qquad \text{Equation 1:}$$

ρ (e.g., rho) is the bulk resistivity of the conductor, as discussed above; and t is the thickness of the conductor.

Figure 3:
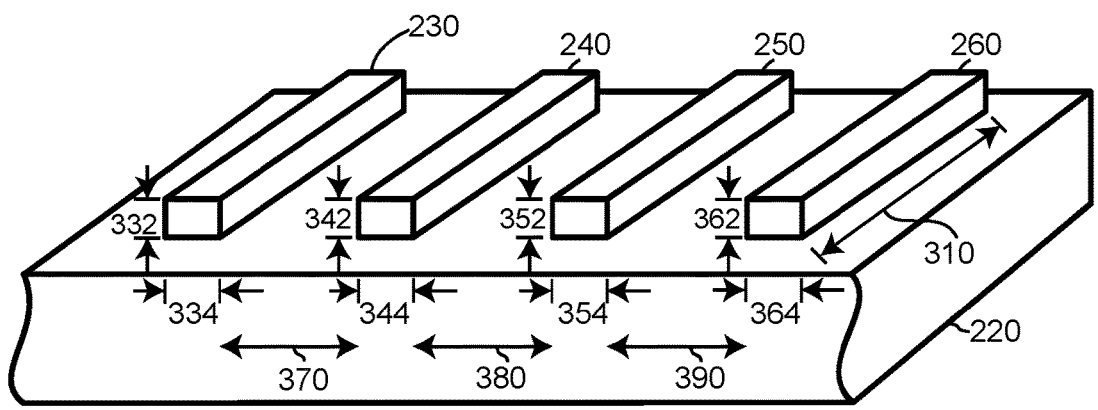
FIG. 3 is a perspective plan view the substrate and conductors of FIG. 2.

An example of a conductor having a sheet resistance and a thickness shown in FIG. 3. Conductors 230-260 have width 334, 344, 354, and 364 and thickness 332, 342, 352, and 362 respectively. An impedance of a conductor having a sheet resistance or an impedance per unit length may be proportional to a length of the conductor. The length of conductors 230-260 is length 310. A total resistance of conductors 230-260 is proportional to length 310.

A total resistance of a conductor may be determined (e.g., calculated) in accordance with the sheet resistance of the material of the conductor, a width of the material of the conductor, and a length of the material of the conductor. The total resistance of a conductor may be expressed as:

$$R=Rs*(L/W) \qquad \text{Equation 2:}$$

The total resistance of conductors 230-260 may be calculated as:

$$R230=Rs230*(\text{length } 310/\text{width } 334);$$

$$R240=Rs240*(\text{length } 310/\text{width } 344);$$

$$R250=Rs250*(\text{length } 310/\text{width } 354); \text{ and}$$

$$R260=Rs260*(\text{length } 310/\text{width } 364); \text{ where:}$$

Rs230, Rs240, Rs250, and Rs260 is the sheet resistance of the material that forms conductor 230, 240, 250, and 260 respectively;

Length 310 is the length of each of the conductors, which in this example all conductors have the same length;

Width 334, 344, 354, and 364 are the widths of conductors 230, 240, 250, and 260 respectively, which may be the same or different; and R230, R240, R250, and R260 are the resistances (e.g., impedances) of the conductors 230, 240, 250, and 260 respectively along the entire length of the conductor.

The total resistance of a conductor may be measured (e.g., detected, determined) by applying a voltage across the conductor, measuring the current through the conductor, and determining the resistance of the conductor. A current used to determine the total resistance of a conductor may enter one end of the conductor, travel the length of the conductor, and exit the other end of the conductor.

According to various aspect of the present invention, in an implementation, at least one conductor of the at least three conductors has a total impedance (e.g., resistance) that is different from the total impedance of the other two conductors. For example, the total impedance of a first conductor is about the same as the total impedance of a second conductor, but a third conductor has a different total impedance from the first conductor and second conductor.

In another implementation, all three conductors have about the same total impedance.

A sheet resistance and/or a total resistance of a conductor may be more or less than a sheet resistance and/or a total resistance of a liquid that is positioned between two or more conductors.

Mechanically coupling conductors to a substrate may position conductors relative to each other. Any one conductor may be positioned proximate to any number of other conductors. The spacing between any two or more conductors may be uniform or variable. The spacing between two or more conductors along the length of the conductors may be uniform or variable. Conductor spacing may relate to the conductive properties of a liquid. Conductors may be spaced apart from each other so that that liquid between the conductors presents an impedance (e.g., resistance) within a desired range. Conductor spacing may relate to a viscosity of a liquid. For example, conductors for detecting a low viscosity liquid may be spaced closely together so that the point (e.g., location, position) where the liquid intersects one conductor will be close to the point where the liquid intersects the other conductors. A lesser distance between conductors encourages a liquid move between conductors rather than spreading (e.g., traveling) a length of one conductor without spreading to the other conductors.

A substrate may be formed of layers of materials. The layers of the materials may be the same and/or different. A layer may be formed of one or more materials having different characteristics (e.g., absorbent, non-absorbent). A conductor may be positioned in or on any layer of the material of a substrate. A conductor may be covered, above and/or below, with a layer of the substrate. A conductor may be coupled to a substrate using any conventional method (e.g., printing, deposition, mechanical) for coupling. A substrate may insulate conductors from each other in the absence of a liquid.

A substrate may absorb, resist penetration of, and/or repel a liquid. A material of a substrate may facilitate the uniform spread of a liquid through the substrate. A material of a substrate may retard the movement of (e.g., by absorption) a liquid through the substrate. A substrate may influence (e.g., direct, guide) the movement of a liquid through and/or across the substrate. A substrate may facilitate movement of a liquid toward and/or between conductors.

A substrate may perform other functions in addition to the functions discussed above. A substrate may protect a surface (e.g., mattress, bed, wheel chair) from a liquid. A substrate may improve sanitation by being disposable after use. A substrate may provide comfort to a patient (e.g., wick moisture away, retain moisture in a location). A substrate may retain moisture, when present, in an area. A substrate may form the material of clothing for a human. A substrate may function as an insulator. A substrate may perform the function of a protective barrier.

A substrate may include conductors and/or electronic circuits positioned in and/or on the substrate. A substrate may include electronic infrastructure (e.g., buses, power, ground) for electrically coupling to electronic circuits. A substrate may include structure for coupling mechanically and/or electrically to conductors and/or a reader.

A reader may detect the presence of a liquid. A reader may detect a position of a liquid along a length of a conductor. A reader may detect an area of a liquid. A reader may detect a current flow through a circuit (e.g., loop) that may include some or all of a conductor, a substrate, and a liquid. A reader may detect the impedance of a circuit. A reader may detect an impedance of a conductor and/or a portion of a conductor in a circuit. A reader may electrically couple to one or more conductors. A reader may apply a voltage across a circuit. A circuit may include a portion of one or more conductors, a portion of a substrate, and a portion of a liquid. A reader may detect a current flow through circuit that includes one or more conductors, a substrate, and/or a liquid. A reader may detect an impedance of a circuit that includes one or more conductors, a liquid, a substrate or a combination thereof.

A reader may determine a physical property of a conductor, a liquid, a substrate, and/or a combination of the conductor, liquid and substrate. A physical property may include capacitance, inductance, temperature, and impedance.

A reader may determine a physical characteristic of a liquid. A reader may use a detected physical characteristic of a liquid to determine a type of the liquid. A reader may use one or more physical characteristics of a liquid in combination with information regarding the physical characteristics of materials to determine the type of the liquid.

A power supply may mechanically and/or electrically couple to one or more conductors. A power supply of a reader may provide a voltage across one or more conductors, a substrate, and/or a liquid. A power supply may provide a current to one or more conductors, a substrate, and/or a liquid. A power supply may report a magnitude of a provided voltage and/or current. A power supply may include any conventional power supply, power supply technology (e.g., solar cells), and/or battery.

A detector and/or a processing circuit may mechanically and/or electrically couple to one or more conductors. A detector and/or a processing circuit may detect a current that flows through one or more conductors, a substrate, and/or a liquid. A detector and/or a processing circuit may detect a voltage applied across one or more conductors, a substrate, and/or a liquid. A detector and/or a processing circuit may report a magnitude of a detected current and/or voltage. A detector may include any conventional circuit and/or sensor for detecting a voltage and/or a current.

A processing circuit may perform any conventional type of calculation (e.g., add, subtract, multiply, divide, regression, integrate) and/or conversion (e.g., AtoD, DtoA, scale, invert). A processing circuit may store information. A processing circuit may detect physical properties (e.g., temperature, voltage, current, time). A processing circuit may perform a calculation using detected and/or stored information. A processing circuit may provide a result of detecting, calculating, and/or converting. A processing circuit may perform a function in accordance with a result of a calculation, a result of a conversion, and/or a physical property detected. A processing circuit may include any conventional circuit for performing the functions of a processing circuit including converters, sensors, microprocessors, signal processors, relays, op amps, comparators.

A communication circuit may communicate (e.g., transmit, receive) electronically. A communication circuit may send information to and/or receive information (e.g., data) electronically. A communication circuit may use any conventional protocol and/or circuits for communicating. A communication circuit may receive information for controlling a moisture sensor, a reader, a detector, a processing circuit, and/or a power supply via a communication. A processing circuit may receive information from a communication circuit. A processing circuit may perform a function in accordance with information received via a communication circuit. A processing circuit may provide information for transmission to a communication circuit. A processing circuit may control the operation of and/or cooperate with the communication circuit to perform the functions of communication. A processing circuit may perform all or some of the functions of a communication circuit.

A processing circuit may provide a report. A report may include an electronic notice, an audible sound, a light, and/or a printed message. An electronic notice may include a packet of data for communication via a conventional network, a text message for communication via a conventional messaging network, and/or an electronic signal that conveys information. Subject matter of a report may include a notice of detected moisture; a notice of no detected moisture; a notice of a fault of the reader, substrate, and/or conductor; a position of detected moisture; and/or an area of detected moisture. A report may be provided to a communication circuit for transmission.

Figure 2:
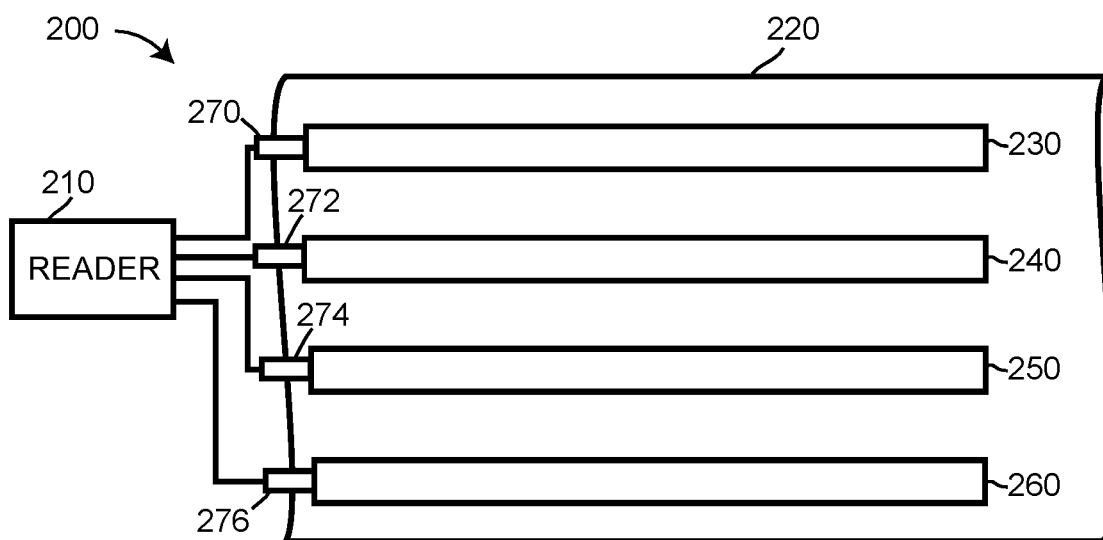
FIG. 2 is a top plan view of an implementation of a moisture detector according to various aspects of the present invention.
Figure 4:
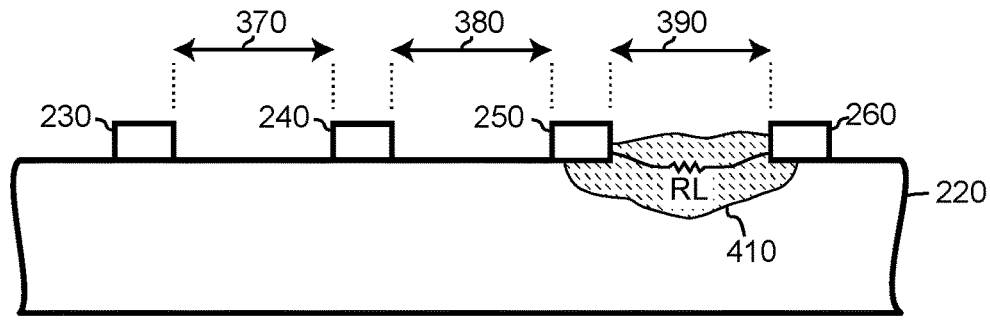
FIG. 4 is a side plan view the substrate and conductors FIG. 2 in the presence of moisture.

For example, moisture detecting system 200 of FIGS. 2-4, includes reader 210, substrate 220, and conductors 230-260. Conductors 230-260 are positioned on substrate 220. In an implementation, substrate 220 is an absorbent (e.g., hygroscopic) pad for use on hospital beds.

Tabs 270-276 facilitate the coupling of reader 210 to conductors 230-260. Tabs may include any conventional leads, clips, connectors, and/or couplers. Tabs may be integral to substrate 220, integral to conductors 230-260, and/or a portion of the wires (e.g., leads, conductors) from reader 210. Preferably, the resistance of tabs 270-276 is significantly (e.g., orders of magnitude if possible) less than conductors 230-260 and/or the resistance of any liquid that may be detected.

In an implementation, conductors 230-260 are formed of a thin film. In another implementation, conductors 230-260 are formed by printing a resistive (e.g., conductive) ink on substrate 220. A resistance per unit length and the total resistance of conductors 230-260 may be in accordance with the sheet resistance of the material used to form the conductors.

Inks (e.g., resistive inks, polymer thick film) used for printing conductors on a substrate may include silver ink, which may have a sheet resistance as low as 8 milliohms per square (e.g., 0.008 ohms per square), carbon ink, which may have a sheet resistance as high as 2000 ohms per square, and mixtures thereof. Resistive inks may include copper inks. In an implementation, a resistive ink used to form conductors has an impedance of 200 milliohms per square.

Conductors 230-260 may have the same or different width (e.g., 334, 344, 354, 364), thickness (e.g., 332, 342, 352, 362), length (e.g., 310), and p.

In an implementation, conductors 230 and 260 have the same total resistance (e.g., R1) and conductors 240 and 250 have the same total resistance (e.g., R2), but the sheet resistance of conductors 230 and 260 is different from the sheet resistance of conductors 240 and 250. The resistivity p or thickness of a conductor may be changed to modify the sheet resistance of the conductor to accomplish different total resistances. In an implementation, conductors 230 and 260 are formed using a material having a first p while conductors 240 and 250 are formed using a material having a second p that is different from the first p. Using materials having a different bulk resistivity p enables conductors 230-260 to have the same width, thickness, and length, yet provide the different total resistances discussed above.

In an implementation, the total resistance (e.g., R230, R260) of conductors 230 and 260 are the same and the total resistance (e.g., R240, R250) of conductors 240 and 250 are the same, but the total resistance of conductors 230 and 260 is different from the total resistance of conductors 240 and 250. The length and/or width of a conductor may be change to modify the total resistance of a conductor. In an implementation, conductors 230-260 all have the same length, conductors 230 and 260 have the same width, conductors 240 and 250 have the same width, but the width of conductors 230 and 260 is different from the width of conductors 240 and 250. In another implementation, conductors 230-260 all have the same length and width, but the bulk resistance of conductors 230 and 260 is different from the bulk resistance of conductors 240 and 250.

Two conductors may be used to detect a presence of a liquid. A liquid that spreads (e.g., spans, contacts, bridges) between two conductors may establish a finite (e.g., not infinite, not open circuit) impedance between the conductors. When no liquid bridges between the two conductors, the magnitude of the impedance between conductors is large (e.g., infinite, open circuit) and no electrical circuit may be established between the two conductors. When no electrical circuit exits between two conductors, it is likely that there is no liquid between the two conductors.

For example, no liquid bridges between conductors 230, 240, and/or 250, so the impedance between conductors 230, 240, and/or 250 is infinite. Liquid 410 spans between conductors 250 and 260. Liquid 410 also permeates a portion of the substrate between conductors 250 and 260. Because liquid 410 is conductive, liquid 410 establishes finite impedance RL between conductors 250 and 260. Applying a voltage across (e.g., between) conductors 250 and 260 establishes a voltage across RL which permits a current to travel between conductors 250 and 260 via impedance RL. The impedance RL between conductors enables reader 210 to detect the presence of the liquid (e.g., moisture).

When a liquid spreads between two or more conductors, a uniform distance between conductors increases the likelihood that the impedance of the liquid between conductors is the same. The distance between conductors and/or the material of the substrate proximate to conductors may be such that a liquid will more likely spread between proximate conductors rather than spreading only along a length of one conductor. Since the impedance of the liquid between the conductors (e.g., RL) permits reader 210 to detect moisture, conductors spacing or substrate material that facilitates the spread of a liquid between conductors facilitates detecting moisture.

Figure 5:
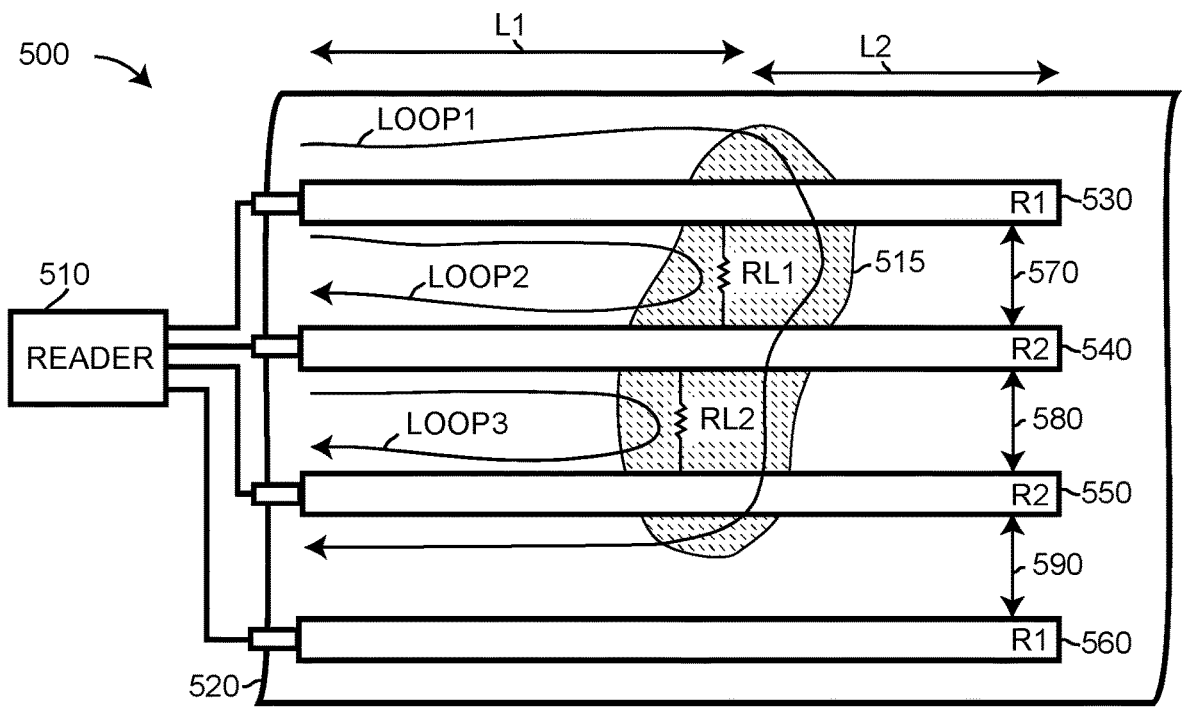
FIG. 5 is a top plan view of an implementation of a moisture detector in the presence of moisture according to various aspects of the present invention.

In an implementation of a moisture detecting system, system 500, referring to FIG. 5, the distance between conductors 530 and 540 (e.g., 570), conductors 540 and 550 (e.g., 580), and conductors 550 and 560 (e.g., 590) is approximately the same. The total resistance (e.g., impedance) of a conductor in this implementation is the resistance as measure from the end of the conductor proximate to reader 510 along the length of the conductor to the end of the conductor distal from reader 510.

The total resistance of conductor 530 and conductor 560 is the same (e.g., R1). The total resistance of conductor 540 and conductor 550 is the same (e.g., R2). The total resistance of conductors 530 and 560 is different from the total resistance of conductors 540 and 550 (e.g., R1 R2). Further, as discussed above, the total resistance of at least one conductor of any group of three conductors (e.g., 530, 540, 550, 560) selected is different. For example, of the three conductors 230-250, the impedance of conductor 230 is different from the impedance of conductors 240 and 250. The difference in the total resistance of the conductors may be due to the factors (e.g., Rs, width) discussed above.

Liquid 515 spans from conductor 530 to conductor 550 establishing impedances RL1 and RL2 through the liquid between conductors 530 and 540 and conductors 540 and 550 respectively. Liquid 515 may or may not permeate substrate 520.

To detect whether a liquid is present, reader 510 may apply a voltage to conductors 530-560 and detect the resulting current. For example, reader 510 applies a voltage across conductors 530 and 540. Because impedance RL1 exits between conductors 530 and 540 a current flows in loop2 thereby indicating the presence of a liquid to reader 510. The reader may also apply a voltage across conductors 540 and 550 and because impedance RL2 exits between conductors 540 and 550, a current flows in loop3 thereby informing reader 510 of the presence of a liquid. Reader 510 may also applied a voltage across conductors 530 and 550 to detect a current that flows in loop1 through impedances RL1 and RL2 thereby detecting the presence of a liquid.

Reader 510 may apply a voltage across conductors 530 and 560, 540 and 560, or 550 and 560; however, because the liquid does not reach conductor 560, no electrical path (e.g., circuit, loop) exists between conductors 530-550 and conductor 560, so reader 510 detects (e.g., determines) that there is no liquid between conductors 530-550 and conductor 560.

According to various aspects of the present invention, reader 510 may also detect (e.g., determine, measure, calculate) the position of liquid 515 with respect to the length of two or more conductors. For example, reader 510 may detect that the location of liquid 515 is a distance L1 along the length of conductors 530-540. To detect the position of the liquid, reader 510 applies a voltage across conductors 530 and 540, measures the current that flows, and calculates the impedance of loop2. The impedance of loop2 may be expressed as:

$$R\text{loop2} = R530\_\text{along}\_L1 + RL1 + R540\_\text{along}\_L1,$$
where: Equation 3:

Rloop2: is the impedance along loop2 from reader 510 along length L1 of conductor 530 through the impedance RL1 and along the length L1 of conductor 540 back to reader 510;

R530_along_L1 is the impedance along length L1 of conductor 530;

RL1 is the impedance through the liquid between conductor 530 and conductor 540; and R540_along_L1 is the impedance along length L1 of conductor 540.

Because the impedance RL1 of liquid 515 short circuits conductors 530 and 540, the impedance of the entire length (e.g., L1+L2) of conductor 530 or 540 is not part of the circuit of loop2. Current from reader 510 flows only through the L1 portion of the conductors.

The depiction of length L1 in FIG. 4 is not intended to be exact. Because reader 510 is attached to the left side, with respect to FIG. 5, of the conductors, length L1 will likely be toward the left side of the pool of liquid 515, as opposed to the middle of the pool or right side of the pool. Length L1 will be the distance from the left side of the conductors to the portion of liquid 515 that provides (e.g., establishes) an electrical coupling (e.g., via resistances RL1 and RL2) between conductors 530, 540, and 550. Establishing resistances RL1 and RL2 may depend on the material of the substrate, the amount of saturation of the substrate, the conductivity of the liquid, the shape (e.g., flat, concave, convex) of the substrate, and the separation of the conductors.

For example, referring to FIG. 4, liquid 410 has been absorbed, at least partially, by substrate 220 so that liquid 410 is positioned between (e.g., across, bridging) conductor 250 and 260. Liquid 410 is conductive so it functions as impedance RL between conductor 250 and 260. The bulk resistance (e.g., rho) of blood varies between 150-400 ohms-centimeter (i.e., Ω-cm). The bulk resistance of urine varies between 100-200 Ω-cm. The magnitude of impedance RL depends on the distance between conductors 250 and 260 and the bulk resistance of the liquid between the conductors.

To aid in detecting liquid, the distance between conductors 250 and 260 is uniform along the lengths of the conductors. Distance 390 between conductors 250 and 260 sets a maximum value for RL of liquid 410. For example, if the distance between conductor 250 and 260 is one centimeter, the magnitude of resistance RL will be between 150 and 400 ohms for blood and 100 to 200 ohms for urine.

Reader 510 further applies a voltage across conductors 540 and 550, measures the current that flows, and calculates the impedance of loop3. The impedance of loop3 may be expressed as:

$$Rloop3 = R540\_along\_L1 + RL2 + R550\_along\_L1, \text{ where:} \qquad \text{Equation 4:}$$

Rloop3: is the impedance along loop3 from reader 510 along length L1 of conductor 540 through the impedance RL2 and along the length L1 of conductor 550 back to reader 510;

R540_along_L1 is the impedance along length L1 of conductor 540;

RL2 is the impedance through the liquid between conductor 540 and conductor 550; and R550_along_L1 is the impedance along length L1 of conductor 550.

According to various aspects of the present invention, reader 510 may take the difference of the impedance of loop2 and loop3. The difference may be expressed as:

$$Rloop2 - Rloop3 = R530\_along\_L1 + RL1 + R540\_along\_L1 - (R540\_along\_L1 + RL2 + R550\_along\_L1). \qquad \text{Equation 5:}$$

In this implementation, the distance between conductors 530 and 540 (e.g., 570) and the distance between conductors 540 and 550 (e.g., 580) is about the same (e.g., 570=580). A further assumption is that impedance of liquid 515 is substantially uniform. Because the distances 570 and 580 are about the same and the impedance of liquid 515 is substantially uniform throughout, the magnitude of impedance RL1 and RL2 are the about same. Positioning conductors at equal intervals provides the advantage that when the difference of two loops is taken, the resistances (e.g., RL1, RL2) due to the liquid cancel out. Using the above information and assumptions, the difference of the impedance of loop2 and loop3 simplifies to:

$$Rloop2 - Rloop3 = R530\_along\_L1 - R550\_along\_L1. \qquad \text{Equation 6:}$$

As discussed above, the resistance of conductor 530 is different from the resistance of conductor 550, so the value of the above equation is a finite number and not zero.

As discussed above, the resistance of a conductor that has a sheet resistance is given by Equation 2 (e.g., R=Rs*(L/W)). In this example, the length of Equation 2 is length L1 because the current in either loop2 or loop3 travels only along length L1 and not the entire length of the conductor (e.g., L1+L2). Substitution of Equation 2 into Equation 6 yields:

$$Rloop2 - Rloop3 = Rs530*(L1/W530) - Rs550*(L1/W550), \text{ where:} \qquad \text{Equation 7:}$$

Rloop2−Rloop3: is the difference of the magnitudes of the impedances of loop2 and loop3 as measured by reader 510;

Rs530 is the sheet resistance of the material that forms conductor 530;

L1 is length L1 from the end of a conductor that couples to reader 410 to the location where liquid 515 bridges between the conductors;

W530 is the width of conductor 530; and

W550 is the width of conductor 550.

The magnitudes of Rloop2 and Rloop3 are known. The values of Rs530, Rs550, W530, and W550 are known. The unknown variable in Equation 7 is L1, so the value of L1 may be determined as shown below.

$$L1 = (Rloop2 - Rloop3)/((Rs430/W430) - (Rs450/W450)) \qquad \text{Equation 8:}$$

The difference of Rloop2 and Rloop3 is non-zero because the resistance of conductor 530 (e.g., R1) is different from the resistance of conductors 540 (e.g., R2) and 550 (e.g., R2). In this implementation, the resistance of conductors 540 and 550 are the same. In another implementation, the resistances of conductors 530, 540, and 550 may all be different. The differences of (Rs530/W530) and (Rs550W550) is also likely non-zero because the resistance of conductors 530 and 550 are different because their sheet resistances are different or their widths are different.

Substituting the known values into Equation 8 provides the value of L1, which is the distance from the end of the conductors coupled to reader 510 to the position of liquid 515 along the length of the conductors. Using the above method, according to various aspects of the present invention, a system for detecting moisture may detect the presence of moisture (e.g., liquid) using at least two conductors and the relative position of the liquid using at least three conductors. With three conductors, the position of the liquid may be determined relative to the conductors. If a known relationship exists between the conductors and the substrate, three conductors may be used to determine the position of the liquid with respect to the substrate.

The above method and equations may be used with three or more conductors. Any number of equations may be drafted to determine the length L1. In the above example, had the liquid spread to conductor 560, equations could have been drafted, similar to those above, that include conductor 560.

It is better to develop equations for adjacent conductors, such as loop2 and loop3, as opposed to non-adjacent conductors, such as loop1, because according to various aspects of the present invention, taking the difference of equations of adjacent conductors results in cancelling out the impedances (e.g., resistors RL1, RL2) due to the liquid (e.g., 515). The cancellation, or subtraction, of the resistors due to the liquid, assumes that the resistivity and volume of the liquid is substantially uniform in the area where the liquid contacts the conductors and that the conductors are evenly spaced apart from each other.

As discussed above, a moisture detecting system may detect the presence of moisture with two conductors and the position of the liquid, with respect to the length of the conductors, with three conductors. A system may use four conductors, as shown in FIGS. 2-5, to provide redundancy. Redundancy may be used to verify that the system is functioning properly or to verify a measurement. Additional conductors provide additional adjacent paths for measuring the resistance of a loop. Regardless of the number of conductors available, at least one conductor of the loops measured should have a total resistance that is different from the total resistance of the other conductors of the loops measured. For example, referring to FIG. 5, the resistance of conductor 530 (e.g., R1) is different from the resistance of conductors 540 and 550 (e.g., R2), so loop2 and loop3 may be used to detect the position of the liquid. The resistance of conductor 560 (e.g., R1) is different from the resistance of conductors 540 and 550 (e.g., R2), so loop3 and a loop through conductor 550, the liquid (not shown), and conductor 560 may be used to detect the position of the liquid.

As discussed above, the conductor spacing and/or substrate material may be selected to facilitate the spreading of a liquid between conductors and not along a length of a single conductor. The uniformity of the value of the resistance of the liquid between conductors is enhanced when the liquid spreads across the conductors in substantially the same location as opposed to running along one or more conductors before spreading to the other conductors. Having the liquid spread between the conductors in substantially the same position along the length of the conductors improves the accuracy of determining the position of the liquid along the length of the conductor.

Figure 6:
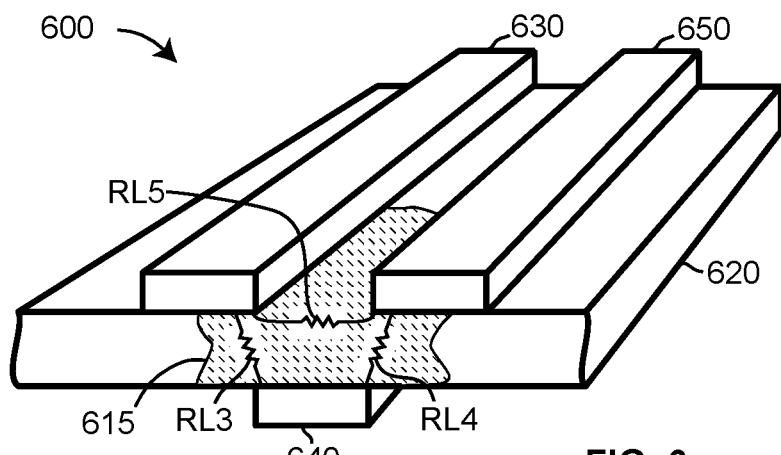
FIG. 6 is a perspective plan view of another implementation of a substrate and conductors of a moisture detector.

In another implementation, conductors and substrate 600 of FIG. 6, includes conductors 630, 640, and 650 coupled to substrate 620. Conductors 630, 640, and 650 run parallel to each other. Conductors 630 and 650 are positioned on one side of substrate 620 and conductor 640 is position on the other side of substrate 620. The distance between each conductor is the same, so conductor 630 is the same distance from conductor 640 and 650 and conductor 640 is the same distance from conductor 650. The substrate is absorbent. The distance between conductor 640 and 630 and conductor 640 and 650 may be the same as the distance between conductor 630 and 650 when substrate 620 contains or is saturated with a liquid.

Absent a liquid, for example liquid 615, in substrate 620, the impedance between the conductors is infinite (e.g., open circuit). When liquid is absorbed by substrate 620, the conductivity of the liquid establishes impedance (e.g., resistances) RL3, RL4, and RL5 between conductors 630 and 640, conductors 640 and 650, and conductors 630 and 650 respectively.

As discussed above, the resistance of conductor 630 is different from the resistance of conductors 640 and 640 or the resistance of all conductors 630, 640, 650 are different. Because the distance between the conductors is about the same and the conductivity of the liquid is likely uniform in the proximity of the conductors, the magnitudes of RL3, RL4, and RL5 are about the same.

The resistance of two loops of conductors and substrate 600 may be measured and the difference of the loops taken to determine the position of liquid with respect to conductors 630-650, as discussed above. The distance between the conductors, including the thickness of substrate 620, and the material of substrate 620 may be selected so that liquid has the propensity to spread (e.g., bridge) between the conductors at a location rather than traveling (e.g., seeping) along the length of a conductor.

Conductor placement on the substrate may permit locating the position of a liquid relative to the substrate. In an implementation, conductors, such as separate and electrically not connected instances of conductors 230-260, may be organized as groups positioned at different locations on the substrate. A substrate may include one or more groups of conductors (e.g., 130, 132). A group of conductors may be positioned a distance away from another group of conductors. Detecting a liquid with one group, but not another may provide an indication of the location of the liquid relative to the substrate. Detecting a liquid by one or more groups may indicate the area of the substrate covered by the liquid.

In another implementation, conductor separation may be used to separate the area of a substrate into zones. For example, in system 700, referring to FIG. 7, the space between conductors 730, 740, and 750 is greater in zones 760, 762, and 764 than in zones 770 and 772. Increased spacing between conductors in zones 760, 762, and 764 decreases the likelihood that liquid will quickly spread to contact all three conductors, so the likelihood of detecting liquid in zones 760, 762, and 764, even though it may be present, is reduced. The closer spacing between conductors 730, 740, and 750 in zones 770 and 772 increases the likelihood that a liquid will spread between all three conductors thereby providing the opportunity to detect the presence and location of the liquid. When a substrate is split into zones, detecting the position of a liquid relative to the length of the conductors may be of less importance than merely detecting the presence of the liquid. A substrate with zones of small area (e.g., high granularity) may decrease the importance of determining the position of the liquid in the zone. A substrate with zone of larger area may benefit from detecting zone and the position of a liquid in the zone using the methods discussed above. In either case, detecting the position of the liquid along a set of conductors, as discussed above, may be used to detect the zone where a liquid is positioned.

Figure 7:
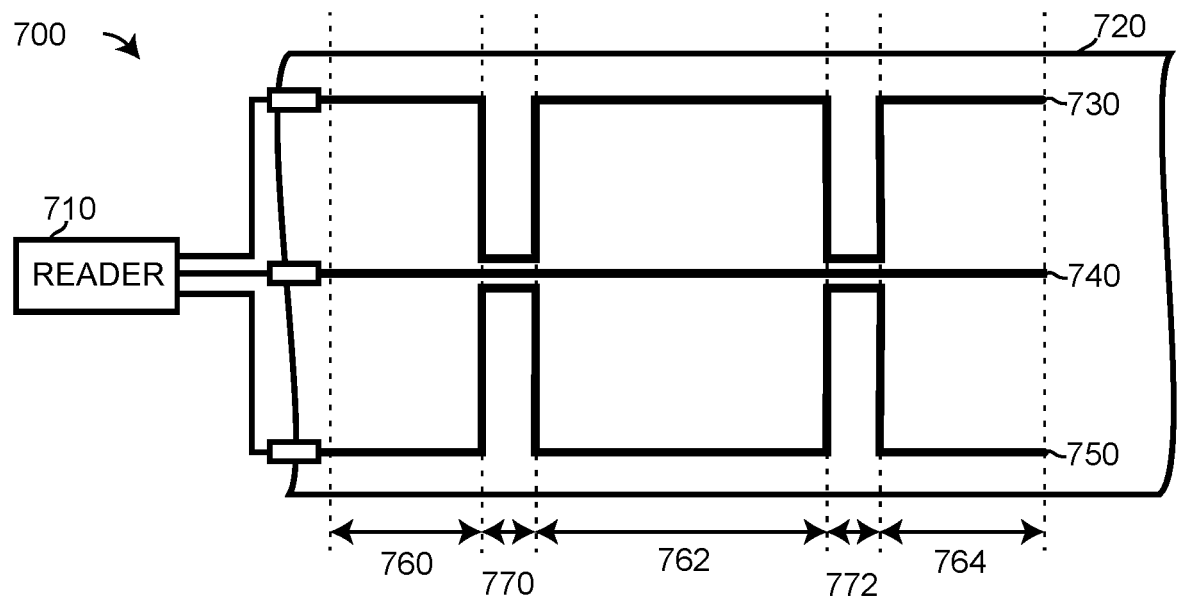
FIG. 7 is a top plan view of another implementation of a moisture detector that includes zones according to various aspects of the present invention.

In the implementation of FIG. 7, decreasing the likelihood of detecting liquid in zones 760, 762, and 764 decreases the granularity of the position determined by reader 710. The position of liquid may most likely be detected in zones 770 and 772 and less likely in zones 760, 762, and 764. Because reader 710 is positioned on the left side, with respect to FIG. 7, of the substrate and conductors, the difference in resistance, referring to Equation 6, in zone 770 will be less than the difference in resistance in zone 772 because the distance from reader 710 to zone 770 is less than the distance from reader 710 to zone 772. Detecting the zone where the liquid is located, as opposed to the length along a conductor, is a more simple calculation and may be performed by a comparator rather than using a processing circuit that includes a microprocessor.

Zones may also be created by insulating (e.g., coating, protecting, sheathing, encasing) the conductors in the zones where liquid is not to be detected and left uninsulated (e.g., exposed, unprotected) in zones where detecting liquid is desirable.

For example, in system 800 of FIG. 8, two or more, preferably all, of conductors 830, 840, and 850 may be insulated in zones 860, 862, and 864. The conductor spacing in zones where the conductors are insulated is unimportant, so they may be closely or broadly spaced. In the zones where detecting liquid is desired, conductors 830, 840, and 850 may be left uninsulated and are spaced, as discussed above, to facilitate the spread of liquid between the conductors. As liquid spreads across the substrate, the presence of liquid only those areas where the conductors are uninsulated will permit the reader to detect the presence and/or position of the liquid. As discussed above, creating zones may result in simplifications of reader 810.

Conductor separation may be combined with conductor insulating to create zones. Zones may be used to exclude portions of an area from detecting a liquid.

Resistive wire may perform the function of a conductor as discussed above. A covering of a resistive wire may perform the function of a substrate as discussed above. A resistive wire includes a wire (e.g., strip) that has a known resistance per length. Resistance per length may be expressed as ohms per circular mil foot (e.g., ohms/CMF, $\Omega$/CMF), which is the resistance in ohms of a wire that is one foot in length and 1 mil (e.g., 0.001 inch) in diameter. For example, an alloy of 55% copper and 45% nickel that is 0.01 inches in diameter has a resistive value of 2.94 ohms per foot at 68 degrees Fahrenheit.

A resistive wire may be encased (e.g., sheathed) in an absorptive material to retain liquid between the wires to establish resistances between the wires for detecting the presence and position of a liquid. A material that encases a resistive wire may perform the functions of a substrate as discussed above. For example, referring to FIGS. 9-10, resistive wires 930, 940, and 950 are sheathed in absorptive material 932, 942, and 952 and positioned proximate to each other. The wires, and their respective sheaths of absorptive material, may be twisted around each other to help them retain their position relative to each other. The sheaths may be mechanically coupled (e.g., adhesive) to retain the wires in a position relative to each other. A reader, not shown, may be coupled to the wires. Conductive liquid 1015 enters absorptive material 932, 942, and 952 to establish resistances RL6, RL7, and RL8 between conductors 930, 940, and 950. A reader may detect the presence of liquid 1015 and/or the location of liquid 1015 along a length of the resistive wires as discussed above. The resistance (e.g., per unit length, total) of at least one of the resistive wires (e.g., conductors) should be different than the resistance of the other wires. A resistive wire may have a different resistance by having a different diameter or being formed of a different material. It is assumed that the length of the resistive wires is all about the same.

As discussed above, it is preferred for a reader to read a loop formed of adjacent conductors. In configuration 900, each wire is adjacent to the other two wires, so loops may be formed between any two wires. Zones may be formed along the length of conductive wires by using non-absorptive sheathing to form zones where liquid cannot be detected and zones using absorptive sheathing to form zones where liquid may be detected.

The area of a substrate may also be separated into zones by varying the resistance of a conductor in accordance with one or more locations with respect to the substrate. The variation in the impedance (e.g., resistance) of a conductor may be linear. Conductors having a sheet resistance were discussed above. The variation, moving from one end (e.g., left) to the other end (e.g., right), of a conductor having a sheet resistance is linear as long as the sheet resistance and width of the conductor remain constant along the length of the conductor.

Variation of the resistance of a conductor may be stepwise. A step-wise variation occurs when the resistance from one location in a conductor to a next proximate location changes by a unit. For example, movement from left to right by an amount may result in a unit increase in resistance. A change in resistance may be accomplished by changing the material that forms the conductor, changing a width of the conductor, changing a sheet resistance of the conductor, or inserting a resistance (e.g., component) into the conductor.

Changing a material of the conductor to vary the resistance of the conductor may be accomplished by forming a portion of the length of the conductor of one material and a portion of the next length of the conductor of another material that has a different resistive value (e.g., sheet resistance). The material of the conductor may alternate along a length of the conductor so that a first material is followed by a second material that is followed by the first material and so forth. Any number of different materials may be placed in series to vary the resistance of a conductor.

A resistive wire, as discussed above, may be formed of different materials in series to accomplish step-wise changes in resistance along a length of the wire.

In another implementation, resistors may be inserted into a conductor by inserting resistors, in whatever form, between segments of the conductor so that the resistors are in series with the conductor along its length.

For example, system 1100 of FIG. 11 includes reader 1110, substrate 1120, and conductors 1130-1156. Reader 1110 couples to the conductors at a left side, with respect to FIG. 11, of substrate 1120 with references to FIG. 11.

Conductors 1130 and 1140 are formed of a material having a sheet resistance as discussed above. Conductors 1130 and 1140 extend from a left side, with respect to FIG. 11, of substrate 1120 to a right side of substrate 1120. Because conductors 1130 and 1140 are formed of a material having a sheet resistance and, in this implementation, have a constant width, the resistance of conductor 1130 or conductor 1140 is substantially the same and increases linearly along the length of the respective conductor. Conductor 1130 may have the same resistance (e.g., same sheet resistance and width) as conductor 1140 or the resistance of conductor 1130 may be different (e.g., different sheet resistance, different materials, different width) from the resistance of conductor 1140. As discussed above, they are the same in this implementation.

Conductor 1150 is formed of different segments coupled in series. In an implementation, segments 1152-1156 are formed of a same material. The material of segments 1150-1156 may be of the same material as the material used to form conductor 1130 or conductor 1140. Segments R01-R03 are formed of a material that has a different, preferably higher, resistance than the resistance of segments 1152-1156. A different resistance may include a different sheet resistance and/or a different total resistance for the length of segments R01-R03.

Segments R01-R03 may be formed of a material that is different from the material used to form segments 1152-1156 and/or conductors 1130 and 1140. Segments R01-R03 may be formed of the same material used to form segments 1152-1156 and/or conductors 1130 and 1140. Segments R01-R03 may be formed of a same or different material having a different physical structure (e.g., thickness, width) than segments 1152-1156 and/or conductors 1130 and 1140. Segments R01-R03 may be formed of a resistive component (e.g., chip, axial metal oxide, metal film MELF, carbon composite molded, wire-wound, thick film, ceramic, metal foil) coupled in series with proximate segments of segments 1152-1156.

In an implementation, the magnitude of the resistance of conductor 1130, conductor 1140, and the whole of segments 1152-1156 is less than the expected magnitude of the resistance of possible liquids that are likely to contact conductors 1130-1150. The magnitude of the resistance of each segment R01-R03 is greater than the magnitude of the resistance of possible liquids that are likely to contact conductors 1130-1150.

For example, the bulk resistance (e.g., rho) of blood varies between 150-400 ohms-centimeter (e.g., $\Omega$-cm). As discussed above, the separation between the conductors, the thickness of the substrate, and the absorbency of the substrate may be used to influence (e.g., shape, control) the volume of blood that contacts the conductors and the magnitude of the resistance (e.g., RL) of the blood between conductors.

The sheet resistance of conductors 1130-1150, in this implementation, is less than the expected sheet resistance of the blood that comes into contact with conductors 1130-1150. The sheet resistance of conductors 1130-1150 may be significantly less (e.g., 1-2 orders of magnitude) less than the expected sheet resistance of blood that contacts the conductors and substrate. Segments 1152-1156 may have the same sheet resistance as conductors 1130 and 1140. Conductors 1130-1140 and segments 1152-1156 may be spaced apart from each other and have physical dimensions (e.g., width, thickness) so that the total resistance of conductors 1130-1140 and segments 1152-1156 are less than the resistance of blood (e.g., RL1-RL4) between the conductors and/or segments. The magnitude of the resistance of segments R01-R03 is more than the resistance of blood (e.g., RL1-RL4) between the conductors and/or segments.

The presence and position of a liquid proximate to conductors 1130-1150 may be determined as discussed above. Liquid 1217 forms resistance RL3 between conductors 1130 and 1140 and resistance RL4 between conductance 1140 and 1150. Reader 1110 applies a voltage across conductors 1130 and 1140, measures the current that flows, and calculates the impedance of loop LP12. The impedance of loop LP12 may be expressed as:

$$Rlp12=R1130+RL3+R1140, \text{ where:} \quad \text{Equation 9:}$$

Rlp12: is the impedance along loop LP12 from reader 1110 along length of conductor 1130 to the location of liquid 1217, through the impedance RL3 of liquid 1217, and along the length of conductor 1140 from the location of liquid 1217 back to reader 1110;

R1130 is the impedance of conductor 1130 along its length from reader 1110 to the location of liquid 1217;

RL3 is the impedance through liquid 1217 between conductor 1130 and conductor 1140; and R1140 is the impedance of conductor 1140 along its length from the location of liquid 1217 to reader 1110.

Reader 1110 applies a voltage across conductors 1140 and 1150, measures the current that flows, and calculates the impedance of loop LP13. The impedance of loop LP13 may be expressed as:

$$Rlp13=R1140+RL4+R1156+R03+R1154+R02+R112+R01, \text{ where:} \quad \text{Equation 10:}$$

Rlp13: is the impedance along loop LP13 from reader 1110 along length of conductor 1140 to the location of liquid 1217, through the impedance RL4 of liquid 1217, and along the length of conductor 1150 from the location of liquid 1217, through segments 1152-1156 and R01-R01, back to reader 1110;

R1140 is the impedance of conductor 1140 along its length from reader 1110 to the location of liquid 1217;

RL4 is the impedance through liquid 1217 between conductor 1140 and segment 1156 of conductor 1150;

R1056, R1054, and R1052 are the impedances of segments 1156, 1154, and 1152 of conductors 1150 from the location of liquid 1217 to reader 1110; and R03, R02, R01 are the impedances of segments R01, R02, and R03 of conductor 1150.

Assume, for this example, that the impedance (e.g., resistance) of segments R01, R02, and R03 are the same such that:

$$R\text{comp}=R01=R02=R03. \quad \text{Equation 11:}$$

Further, assume that the distance between conductor 1130 and conductor 1140 is the same as the distance between conductors 1140 and 1152-1156. Further assume that the conductivity of liquid 1217 is fairly uniform, so that the magnitude of RL3 is about the same as the magnitude of RL4, so that:

$$RL=RL3=RL4. \quad \text{Equation 12:}$$

Subtracting Equation 10 from Equation 9 and substituting the equivalent values expressed in Equations 11 and 12 yields:

$$Rlp12-Rlp13=R1130+RL+R1140-(R1140+RL+R1156+R1154+R1152+3*R\text{comp}) \quad \text{Equation 13:}$$

Equation 13 simplifies to:

$$Rlp12-Rlp13=R1130-(R1156+R1154+R1152+3*R\text{comp}) \quad \text{Equation 14:}$$

If the sum of the magnitude of the resistances of segments 1152-1156 is about the same as the magnitude of total resistance of conductor 1130, a further simplification may be made. Factors that provide the same magnitude of resistance include sheet resistance, width, thickness and individual lengths of segments 1152-1156. Assuming that R1130 is substantially equal to (R1156+R1154+R1152), Equation 14 simplifies to:

$$Rlp13-Rlp12=3*R\text{comp} \quad \text{Equation 15:}$$

The difference of the magnitude of the resistances of the loop LP12 and loop LP13 is the number of resistive segments (e.g., R01, R02, R03) between reader 1110 and position of liquid 1217. Using resistive segments, and in this implementation resistive components with a higher resistance than total resistance of conductors 1130 and 1140, segments 1152-1156, and the expected resistance of the liquid simplifies the calculation resulting in potential simplifications in the circuitry use to implement reader 1110.

Using the analysis discussed above, the difference (e.g., Rip13-Rlp12) between the resistance (e.g., Rlp13) of loop LP13 and the resistance (e.g., Rlp12) of loop LP12 for a liquid that spans conductors 1130, 1140, and segment 1154 in zone 1170 is, in its simplified form using the assumptions discussed above:

$$Rlp13-Rlp12=2*R\text{comp} \quad \text{Equation 16:}$$

Analysis for a liquid that spans conductors 1030, 1040, and segment 1052 in zone 1160 is, in its simplified form using the same assumptions discussed above:

$$Rlp13-Rlp12=1*R\text{comp} \quad \text{Equation 17:}$$

The above shows that the multiplier (e.g., 1, 2, 3) of the resistive component (e.g., R01, R02, R03, Rcomp) corresponds to the distance of the resistive component from reader 1110. Further, the resistive components may be considered to separate substrate 1120 into zones. The area of substrate 1120 from resistive element R01 to resistive element R02 corresponds to zone 1160, from resistive element R02 to resistive element R03 corresponds to zone 1170, and to the right of resistive element R03 corresponds to zone 1180. As discussed above, the presence of liquid in zone 1160 will result in reader 1110 detecting the magnitude of resistance of one resistive element; the presence of liquid in zone 1170 will result in reader 1110 detecting the magnitude of resistance of two resistive elements; and so forth as demonstrated above.

Figure 12:
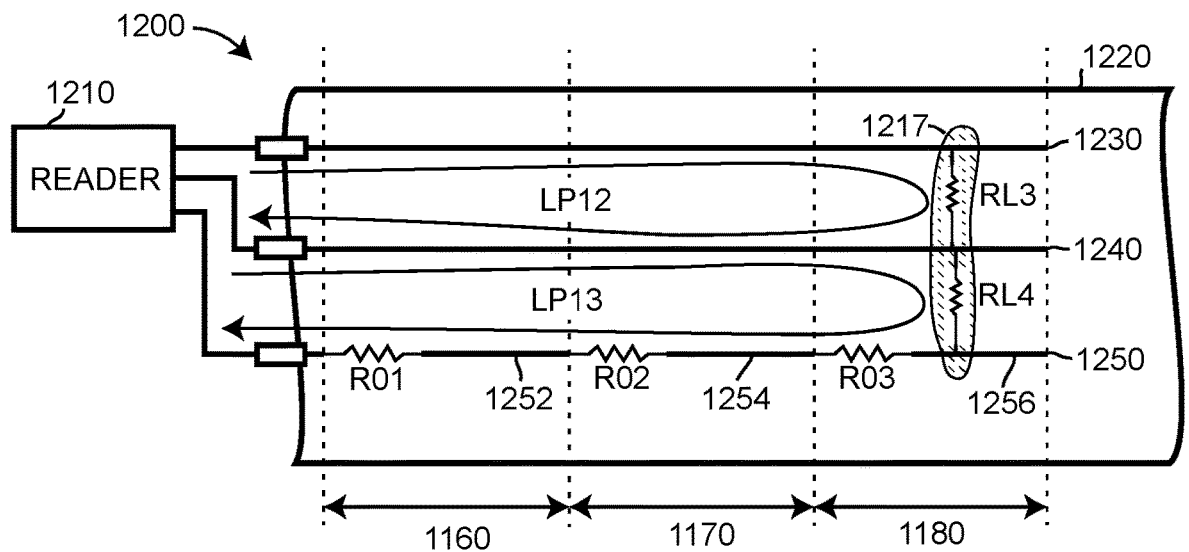
FIG. 12 is a top plan view of the moisture detector of FIG. 11 in the presence of moisture.
Figure 16:
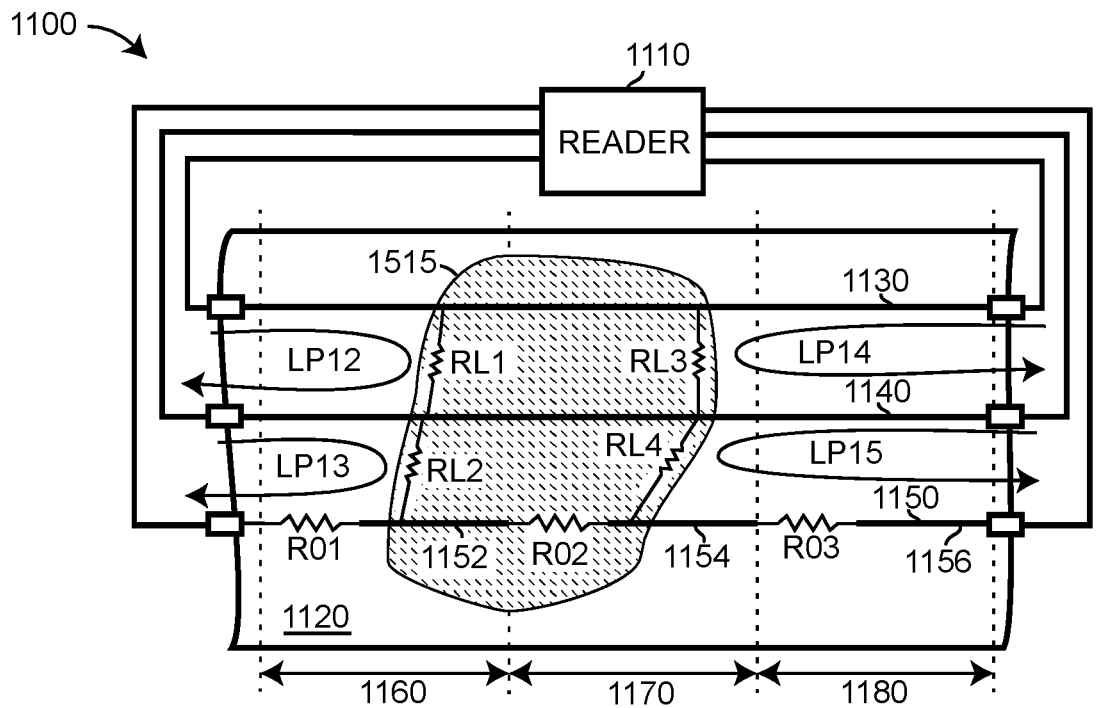
FIG. 16 is a top plan view of another implementation of a moisture detector according to various aspects of the present invention.

Reader 1110 detects liquid only in the most proximate zone. In a situation where liquid spans conductors 1130, 1140, segment 1152, and segment 1154 and/or 1156, reader 1110 would detect only the presence of liquid in zone 1160 and not in zone 1170 and/or 1180. However, as will be discussed in further detail below, reader 1110 is not limited to coupling to only one end of the conductors 1130-1150 or to one side (e.g., left, right) of substrate 1120. Reader 1110 may couple to left end, referring to FIGS. 11-12, of conductors 1130-1150, the right end, or to both ends simultaneously as shown in FIG. 16. Reader 1110 may further couple to a portion of conductors 1130-1150 that is way from either end using leads (e.g., conductors, wires, traces) that are not affected by the presence of a liquid.

Conductors 1130 and 1140, segments 1152-1156, and resistive segments R01-R03 may be printed on substrate 1120 using resistive inks. A process capable of printing different areas of substrate 1120 with different materials is suitable for printing conductors 1130 and 1140, segments 1152-1156, and resistive segments R01-R03. For example, a two-step printing process may be used that prints conductor 1130, conductor 1140, and segments 1152-1156 in one step of one material and resistive segments R01-R03 of a different material in another step.

Figure 13:
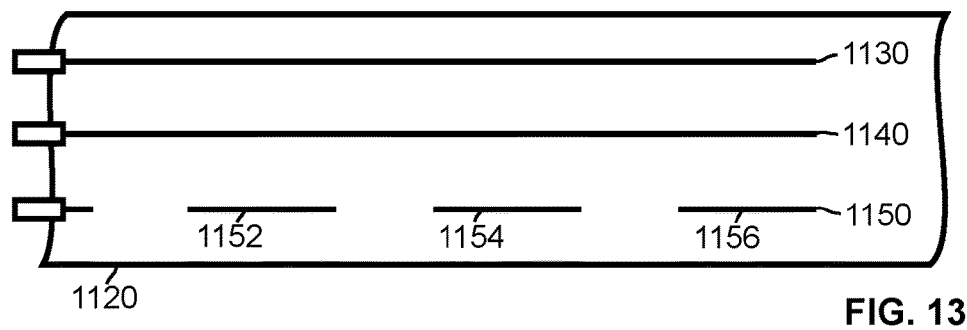
FIG. 13 is a top plan view a partially printed substrate and conductors of the moisture sensor of FIG. 11.
Figure 14:
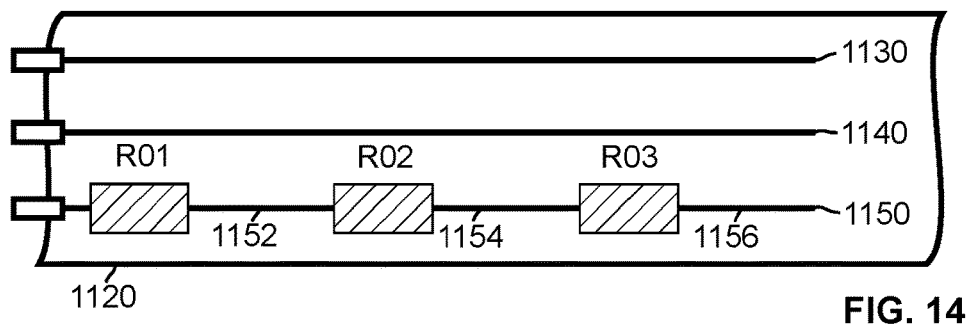
FIG. 14 is a top plan view a printed substrate and conductors of the moisture sensor of FIG. 11.

For example, referring to FIG. 13, in a step of a printing process, substrate 1120 is printed with conductor 1130, conductor 1140, and segments 1152-1156. In another step, referring to FIG. 14, resistive segments R01-R03 are printed. The steps may be performed in any order and/or repeated any number of times. Conventional processes for printing conductive ink may be used.

In another method of manufacturing a substrate and conductors of a moisture sensor, a manufacturing step prints, deposits, or forms conductor 1130, conductor 1140, and segments 1152-1156. In another manufacturing step, resistive components (e.g., resistors) R01-R03 are positioned, mechanically coupled to substrate 1120, and electrically coupled to a tab of the substrate and/or segments 1152-1156 to form conductor 1150. Conventional manufacturing processes may be used. The steps may be performed in any order.

As discussed above, a moisture detecting system, according to various aspects of the present invention, may detect a location of a liquid relative to a length of a conductor and/or a zone. According to various aspects of the present invention, the conductors and reader discussed above may further perform the function of detecting an area of a liquid and/or an increase in area of the liquid over time (e.g., spread). Detecting an increase in the area of a liquid may be accomplished using historical data of the area of the liquid over time. Historical data may be stored for comparison.

As discussed above, a reader may electrically couple to either end of a conductor used to detect the presence and/or position of a liquid. Refer to FIG. 5, reader 510 detects a location of liquid 515 as length L1 from the left end of conductors 530-550 to the liquid. Coupling reader 510 to the right end of conductors 530-550, reader 510 may detect length L2 which is the distance from the right end of conductors 530-550 to liquid 515. In FIG. 5, length L1 and L2 measure from their respective ends of conductors 530-550 to approximately the middle of the body of liquid 515. Measuring to the middle of the body of liquid E15 is an approximation used for developing the equations.

The flow of a current provided by a reader may travel many paths through a liquid from one conductor to another conductor. When the spread of a liquid is small, the current may travel through the middle portion of the liquid. In accordance with the distance between the conductors, the thickness of the substrate, composition of the liquid, the level of saturation of the substrate, and the width (e.g., spread) of the liquid, the liquid may travel from one conductor to another conductor closer to the edge of the spread of liquid.

Figure 15:
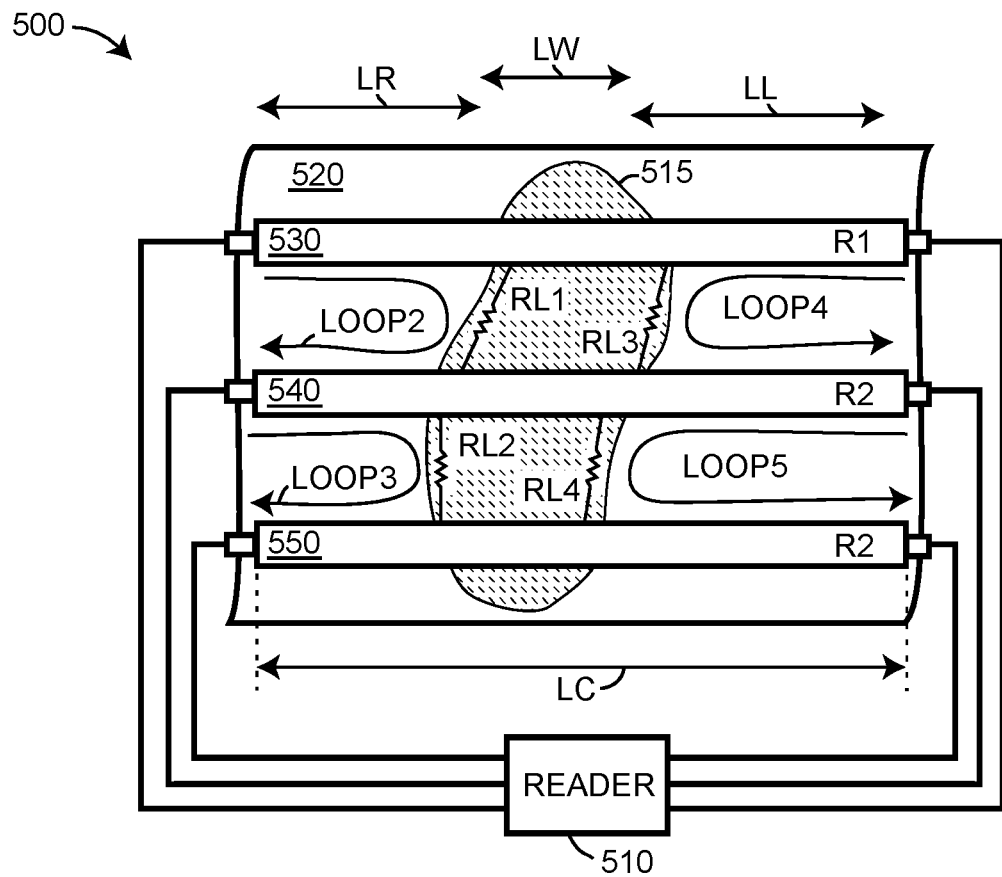
FIG. 15 is a top plan view of an implementation of a moisture detector according to various aspects of the present invention.

Referring to FIG. 15, resistances RL1 and RL2 represent a possible path of a current provided by reader 510 from the left side of conductors 530-550. Resistances RL1 and RL2 are located on a left portion of liquid 515. Resistances RL3 and RL4 represent a possible path of a current provided by reader 510 from the right side of conductors 530-550. Resistances RL3 and RL4 are located on a right portion of liquid 515.

The length of conductors 530-550 are LC. The distance from the left side of conductors 530-550 to resistances RL1 to RL2 is about a distance of RL. As can be seen in FIG. 15, because of the shape of the spread of liquid 515, resistance RL1 is position to the right of resistance RL2, so the distance LR is somewhere between the possible path of the current from conductor 530 to conductor 540 and the possible path of the current from conductor 540 to conductor 550. The same analysis applies to length 12, which is somewhere between the possible paths of current between the conductors. The amount of error in length LR decreases as the spread of liquid 515 increases. Further, the distance between the conductors and the mobility of a liquid through substrate 520 may cooperate to reduce the spread of liquid 515 along the lengths of conductors.

Reader 510 may apply voltages to the left end of conductors 530-550, as discussed above, to determine distance LR. Reader 510 may apply voltages to the right ends of conductors 530-550 through loop4 and loop5, analogous to the method used on the left side, to determine distance 12. Distances LR and 12 may be subtracted for the length of the conductors, LC, to determine the width LW of liquid 515.

Reading from the left and right ends of conductors formed of resistive wires may also be used to determine the area a liquid.

Reading from both ends of conductors may also provide information as to the spread of a liquid in terms of zones. As discussed above and referring to FIG. 16, segments R01-R03 split substrate 1120 in zones 1160-1180. When reader 1110 applies a voltage to the left end of conductors 1130-1150, similar to the situation discussed above, reader 1110 detects a single resistive segment R01. Detecting a single resistive segment R01 indicates that liquid is present in zone 1. When reader 1110 applies a voltage to the right end of conductors 1130-1150 via loops lp14 and lp15, reader 1110 detects a single resistive segment R03. Because of the layout of the resistive elements R01-R03 with respect to the zones, detecting a single resistive element from the right side indicates that there is no liquid in zone 1180, but there is liquid in zone 1170. Reader 1110 may then determine that liquid is present in zones 1160 and 1170. With knowledge of an area of a zone, an estimate of the area of the liquid may be made.

Reading from both ends of a set of conductors may be used to detect water leakage or moisture in over large area.

Resistive wires, as discussed with respect to the implementation of FIGS. 9-10 may be read from both ends to detect the location of moisture. The compact structure (e.g., configuration) of resistive wires facilitates implementing a moisture detection system over a large area. Reading resistive wires from both ends of the wire provides information as to the location of moisture and/or the spread of moisture over time with respect to the resistive wires.

A hierarchy of readers may be used to read resistive wires from both ends. A hierarchy of readers may be used to read (e.g., measure) resistive wires positioned in an area. A first reader that is higher in the hierarchy than a second reader may receive measured (e.g., detected) data and/or calculated information from the second reader or other readers. A second reader may measure data and/or calculate information (e.g., difference, total, sum, liquid location, liquid area, liquid spread) regarding resistive wires and receive measured data and/or calculated information from other readers for providing (e.g., passing onto, transmitting to, reporting to) the first reader. Readers that are lower in the hierarchy may report their measured data (e.g., raw data) and/or calculated information to a reader that is higher in the hierarchy. Readers that are not at the top of the hierarchy may be referred to as slave readers. The reader at the top of the hierarchy may use the data and/or calculated information from the slave readers to determine the location and/or spread of moisture in the area and provide reports regarding its findings. The reader at the top of the hierarchy may be referred to as a master reader.

A hybrid reader may perform the functions of a master reader and a slave reader. A hybrid reader may be coupled to a bundle and may provide voltages and/or currents to the conductors of the bundle as discussed above with respect to a slave reader. A hybrid reader may receive information from other readers as discussed above with respect to a master reader. A hybrid reader may use its measured information and the received information to determine the presence, spread, spread over time, and position of liquid. A hybrid reader may provide a report with respect to liquid.

Figure 17:
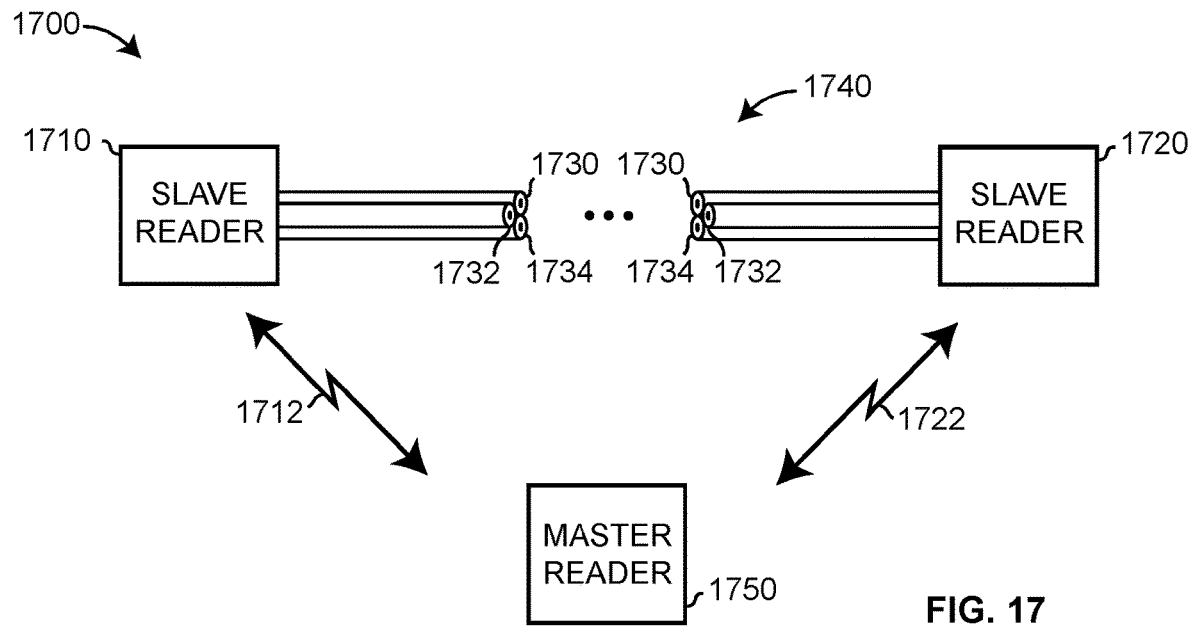
FIG. 17 is a plan view of a moisture detection system using the moisture detector of FIG. 9 with slave readers and a master reader.
Figure 18:
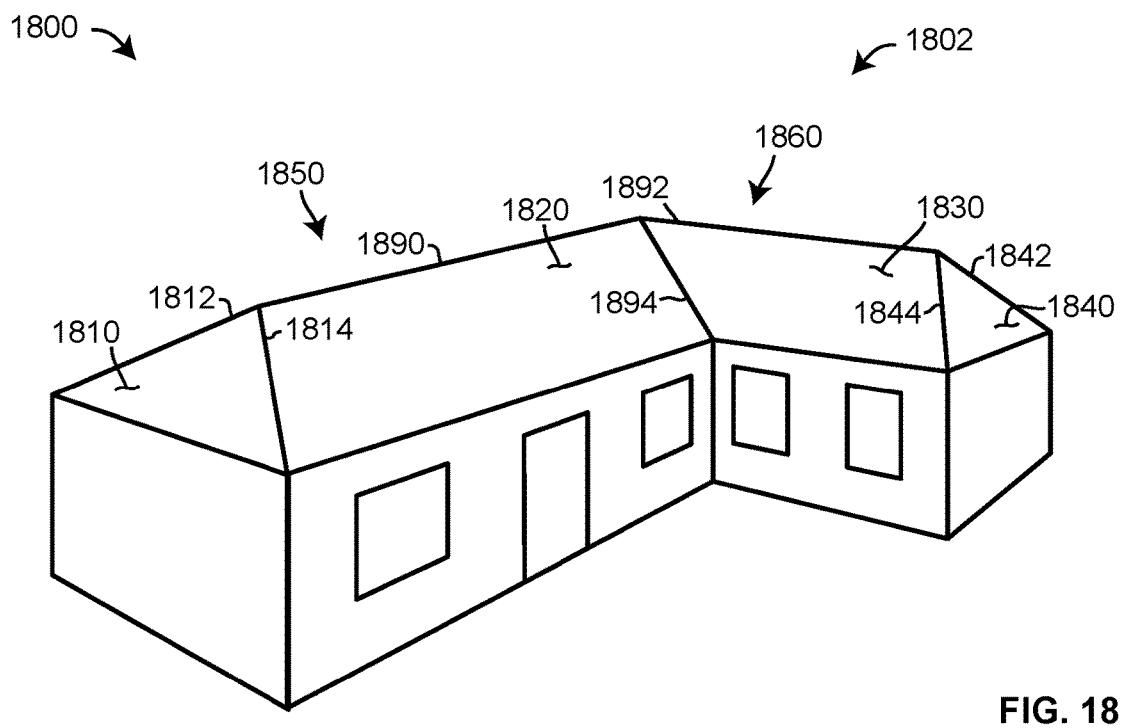
FIG. 18 is a plan view of a house with a roof.

For example, moisture detection system 1700 of FIG. 17 includes a set of three resistive wires. The resistive wires of FIG. 17 perform the functions of conductors discussed above, and in particular the functions of the resistive wires of configuration 900. The set of three wires, hereafter referred to as a bundle or wire bundle, may extend an indeterminate length. The maximum length of a bundle may be limited by the total resistance of one or more of the wires of the bundle. For example, the length of a wire bundle may be limited by the total resistance of the wire that has the highest resistance per length.

At each end of the bundle, the wires of the bundle couple to a reader. In the example of FIG. 17, the readers that couple to the bundle are slave readers. The slave readers apply voltages or currents to the wires of the bundle and measure the magnitudes of the resulting currents or voltages respectively. The slave readers may perform calculations using the provided voltages and/or currents and the measured currents and/or voltages. The slave readers may detect the location of moisture with respect to the wires of the bundle or they collect raw data that relates to voltages and/or currents applied and the currents and/or voltages detected (e.g., measured). A slave reader may provide calculated information and/or raw data to another reader. A slave ready may provide calculated information and/or raw data to another slave reader or to the master reader. The hierarchy of the readers determines which reader or readers receive data from other readers.

A master reader may use received information to detect (e.g., determine, calculate) the location of liquid with respect to one or more bundles. A master reader may further include information that relates a distance along one or more bundles to a position in an area. The master reader may use the information provided by slaver readers to detect the location and/or spread of a liquid with respect to one or more bundles. A master reader may store information to form a historical record to detect a spread of the liquid over time. A master reader may relate the location and/or spread of a liquid to an area. A master ready may report information regarding the liquid. A master reader may report the position and spread of a liquid, the spread of the liquid over time, data received from slave readers, calculations performed, and/or data used to perform calculations.

A master reader may communicate with and/or receive data from any number of slave readers. A master reader may communicate with slave readers using any conventional communication protocol whether wired or wireless. A master reader may provide instructions to a slave reader to perform a function (e.g., operation). A function may include performing a reading, transmitting data, performing a calculation, or providing status of the slave reader. A master reader may control the operation of slave readers so that they do not interfere with each other while making measurements. For example, a master reader may instruct a slave reader at one end of a bundle to perform measurements while the reader at the other end of the bundle is instructed to not perform any measurements.

In an implementation, bundle 1740 spans a distance (e.g., length). Slave reader 1310 couples to wires 1730, 1732, and 1734 of bundle on one end of bundle 1740 while slave reader 1320 couples to wires 1730-1734 on the other end of bundle 1740. Master reader 1750 communicates with slave reader 1710 and slave reader 1720, in this implementation, via conventional wireless communications. Master reader 1750 instructs slave reader 1710 to perform measurements, as discussed above, to detect the presence and, if present, the location of moisture with respect to wires 1730-1734 from the left end, with respect to FIG. 17, of bundle 1740. Master reader further instructs slave reader 1720 to perform measurements, as discussed above, to detect the presence and, if present, the location of moisture with respect to wires 1730-1734 from the right end of bundle 1740. As discussed above, master reader 1750 may instruct slave readers 1710 and 1720 to perform their respective measurements of bundle 1740 at different times so that performance of the measurements do not overlap in time.

Slave readers 1710 and 1720 may return raw data in the form of magnitudes of voltages and/or currents to master reader 1750. Slave readers 1710 and 1720 may return calculated information to reader 1750 such as distances from the left and right ends of bundle 1740 to the location of liquid. Slave readers 1710 and 1720 may include memory for storing historical information as to detected data so that slave readers 1710 and 1720 may return information as to the position of the liquid over time.

Master reader 1750 may use the reported information to determine the location, spread of the liquid, and/or spread of the liquid over time in bundle 1740. Slave readers 1710 and 1720 may have sufficient computational capacity and information (e.g., characteristics of wires) to calculate the location of moisture with respect to wires 1730-1734 and report to master reader 1050 the distance from slave reader 1710 and/or 1720 to the liquid. After receiving information from all slave readers and performing any necessary calculations, master reader 1750 may provide a report of the status of any liquid with respect to bundle 1740 and/or the area occupied by bundle 1740.

Providing a report may include providing a priority message, such as an alarm of urgency if liquid is discovered in areas that are sensitive, if liquid is detected in large quantities, or if liquid is spreading rapidly over time through the area.

An application of a system that uses wire bundles, slave readers, and a master reader is a moisture detection system for the roof of a house or building. House 1800 includes roof 1802. Roof includes sections 1810, 1820, 1830, 1840, 1850, and 1860. Sections 1810, 1820, and 1850 meet at ridge 1890, hip 1812, and hip 1814. Sections 1850 and 1860 meet at hip 1910. Sections 1820 and 1830 meet at valley 1894. Sections 1830, 1840, and 1860 meet at ridge 1892, hip 1844, and hip 1842.

A wire bundle, as discussed with respect to configuration 900 and bundle 1740, may be placed on roof 1802 to detect liquid. Liquid in the area of roof 1802 that may indicate a failure of roof 1802. One or more bundles may be placed at any location on roof 1802. Any number of slave readers may be used to collect and report information to a master reader regarding moisture with respect to roof 1802. The one or more bundles may be place on roof 1802 in any pattern. A single bundle may be used if the length of the wires in the bundle covers the area of roof 1802. Multiple bundles may be coupled serially to form a bundle of a long length.

Multiple bundles may be separately positioned on sections of roof 1802 and coupled to shared or distinct slave readers. For example, a single length of wire bundle and two slave readers may be used per roof section (e.g., 1810-1860). Implementation 1900 of FIG. 19 uses a length (e.g., single, multiple serially connected) of wire bundle for the entire roof 1802. The wire bundles may be placed under the underlayment (e.g., tar paper) of the roof. The wire bundles may be placed under the sheathing (e.g., plywood) on the inside of the attic.

Figure 19:
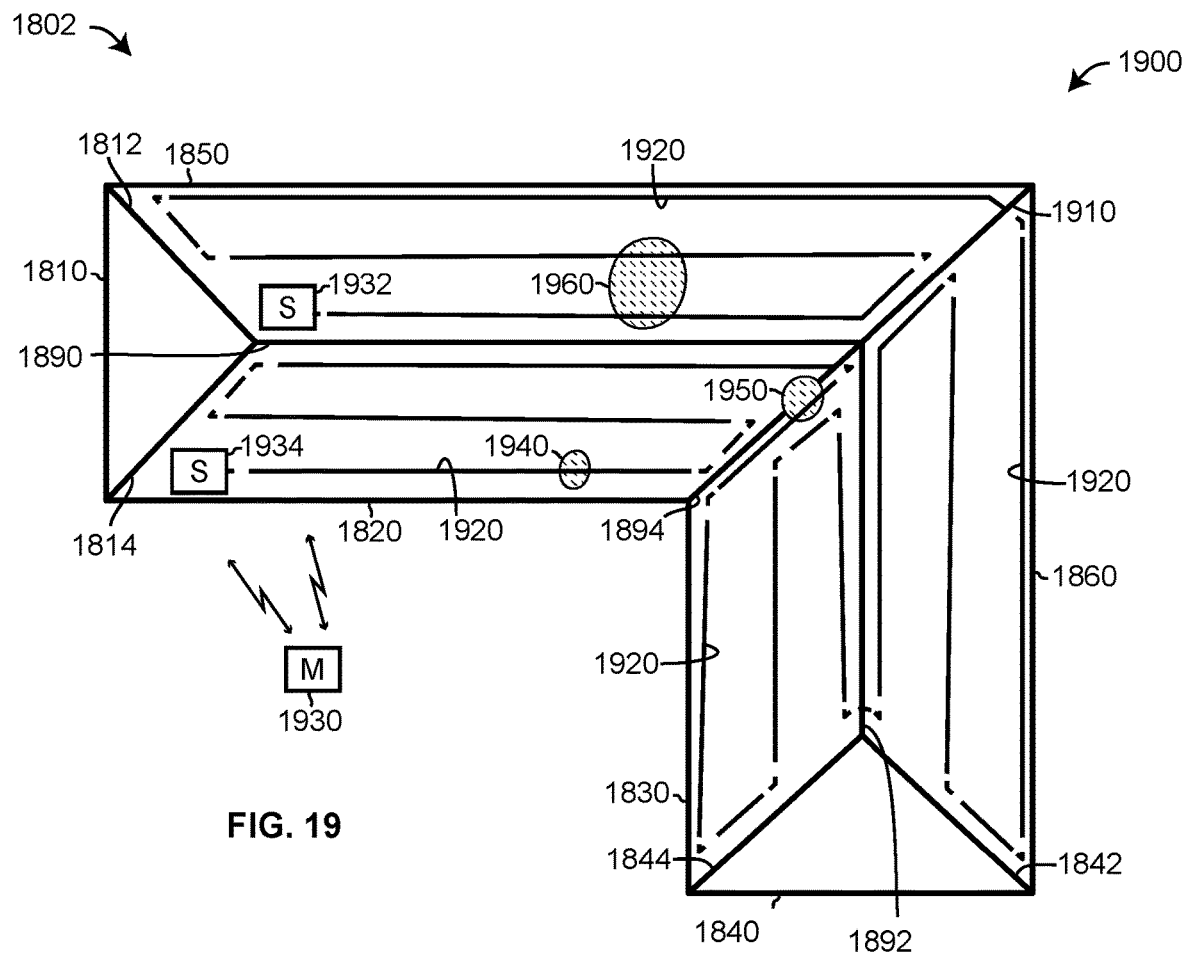
FIG. 19 is a plan view a moisture detection system for the roof of FIG. 18.

Wire bundle 1920 of detection system 1900 extends over and is coupled to roof 1802 on sections 1820, 1830, 1860, and 1850, as shown in FIG. 19. One end of wire bundle 1920 is positioned on section 1850 and the other end of wire bundle 1920 is positioned on section 1820. Slave reader 1932 couples to the end of wire bundle 1920 on section 1850 while slave reader 1934 couples to the other end of wire bundle 1920 on section 1820. Slave reader 1932 and 1934 communicate with master reader 1930 wirelessly.

Portions of wire bundle 1920 are positioned in or near valley 1894 because of the increased likelihood of leaks occurring in valleys. Portions of wire bundle 1920 may be positioned across valley 1894 to intersect any water that may leak through valley 1894 and run downward along valley 1894.

With reference to FIG. 19, assume that patterns (e.g., leaks) 1940, 1950, and 1960 represent water leaks where water comes into contact with wire bundle 1920. Assume, for the moment that only leak 1940 exits. Slave detector 1934 may apply voltages and/or currents and measure currents and/or voltages, as discussed above, along the portion of wire bundle 1920 between slave reader 1934 and leak 1940 to detect the distance of leak 1940 away from slave reader 1934 or to gather information so that master reader 1930 may determine the distance. Slave reader 1932 may also apply voltages and/or currents and measure currents and/or voltages along the length of wire bundle 1920 between slave reader 1932 and leak 1940, which is along a majority of the length of wire bundle 1920. Slave reader 1932 may calculate the distance to leak 1940 or it may provide the measured electrical data to master reader 1930 to calculate the distance.

Once slave readers 1932 and 1934 have performed their measurements, master reader 1930 may relate the detected information to the location of the leak with respect to roof 1802. Relating the distance along wire bundle 1920 to the location of a leak on roof 1802 requires knowledge of a relationship between the length along wire bundle 1920 and positions on roof 1802. Master reader 1930 may have access via a communication link to or store information for relating a distance along wire bundle 1920 to a position on roof 1802. Once the position on roof 1802 has been determined (e.g., calculated), master reader 1930 may provide a report regarding leak 1940.

Information for calculating the location liquid on roof 1802 may include information that relates locations (e.g., areas) of roof 1802 to a position along bundle 1920. For example, referring to FIG. 20, section 1820 has been subdivided by a grid. Master reader 2030 may have (e.g., store) information that relates a distance along bundle 2020 from either reader 2032 or 2034 to an area on section 1820. For example, leak 2014 is positioned in area 2 (e.g., between 2 and 3) along the length of section 1820 and area 2 (e.g., between 2 and 3) on the height of section 1820. Master reader 2030 may report the location of a leak (e.g., 2010, 2012, 2014) in terms of the grid of section 1820. A complete roof 1802 may have one or more grids to facilitate reporting of a leak with respect to the physical layout of the roof.

The procedure discussed above may be used to detect and report single leaks when positioned as leaks 1950, 1960, 2010, 2012, or 2014.

Accurately determining the position of liquid on roof 1802 or addition locations of liquid may be difficult when more than one leak exists. For example, if roof 1802 were to experience simultaneous leaks at locations 1940, 1950 and 1960, slave readers 1932 and 1934 and master reader 1930 would not be able to detect all of the leaks. Further it may be difficult to detect the full extent (e.g., spread) of some of the leaks.

For example, slave reader 1934 would be able to collect information regarding leak 1940, but would not be able to send a current or voltage along the conductors of wire bundle 1920 past the location of leak 1940. Slave reader 1932 would be able to detect and collection information regarding the portion of leak 1960 closes to ridge 1890, but could not detect that leak 1960 extended down from ridge 1890 to a portion of wire bundle 1920 positioned on a lower portion of section 1850. Neither slave reader 1932 nor slave reader 1934 would be able to detect leak 1950 because it lies along the length of wire bundle 1920 between leak 1940 and leak 1960. A single length of wire bundle may not be able to detect the full spread of some leaks or even all leaks. Other configurations (e.g., layouts, patterns) of wire bundles may provide, at greater cost, addition and/or more accurate information regarding leaks. For example, a different length of wire bundle with associated slave readers may be used for each section of a roof and/or the wire bundle may extend along the roof and/or sections in different patterns.

Figure 20:
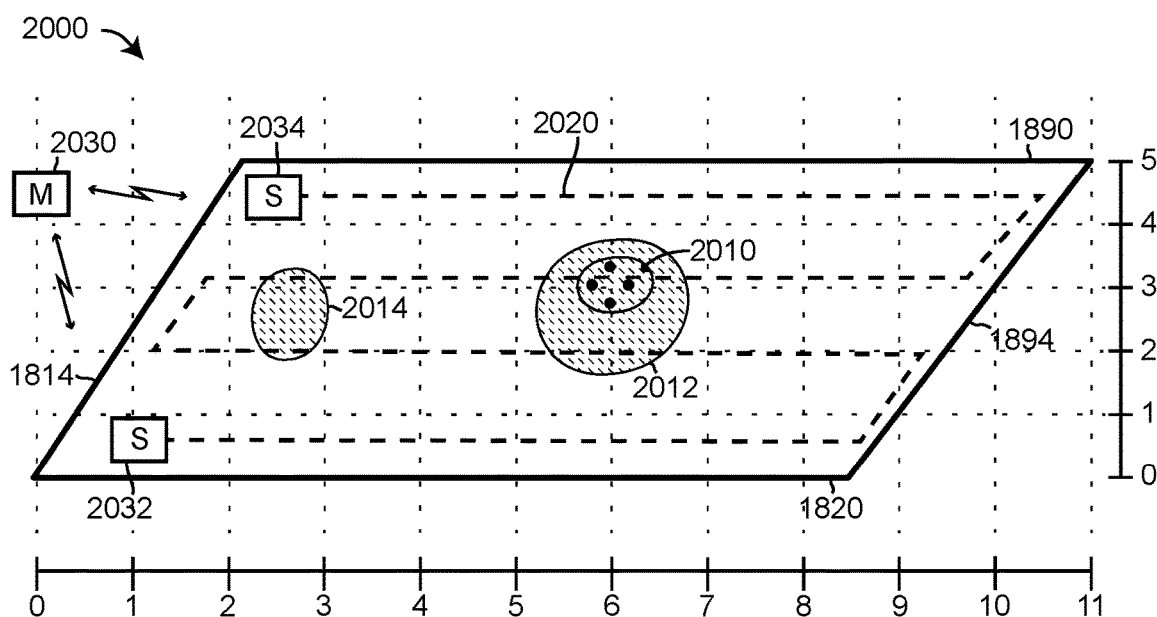
FIG. 20 is a plan view of another implementation of a moisture detection system for a section of the roof of FIG. 19.

Configuration 2000, of FIG. 20, is a configuration of wire bundle 2020 positioned on section 1820 only of roof 1802. Other sections of roof 1802 may have similar or different configurations of wire bundles and slave readers. Slaver reader 2032 couples to the wires of wire bundle 2020 at one end and slave reader 2034 couples to the wires of wire bundle 2020 at the other end. Slaver reader 2032 and slave reader 2034 communicate with master reader 2030 wirelessly. Master reader 2030 would also communicate with the slave readers associated with any other sections of roof 1802 in addition to slaver readers 2032 and 2034. Slave readers 2032 and 2034 of configuration 2000 may detect leak 2010 and 2012 either separately or if they occurred at the same time. If leak 2010 and leak 2014 occurred at the same time, absent leak 2012, slave reader 2034 would be able to detect leak 2010, but not leak 2014 while slaver reader 2032 would be able to detect leak 2014, but not leak 2010. If leak 2012 and 2014 occurred at the same time, readers 2032 and 2034 would not be able to detect leak 2014. Reader 2032 would not be able to detect the extent of leak 2012 on the left portion of the leak.

Figure 21:
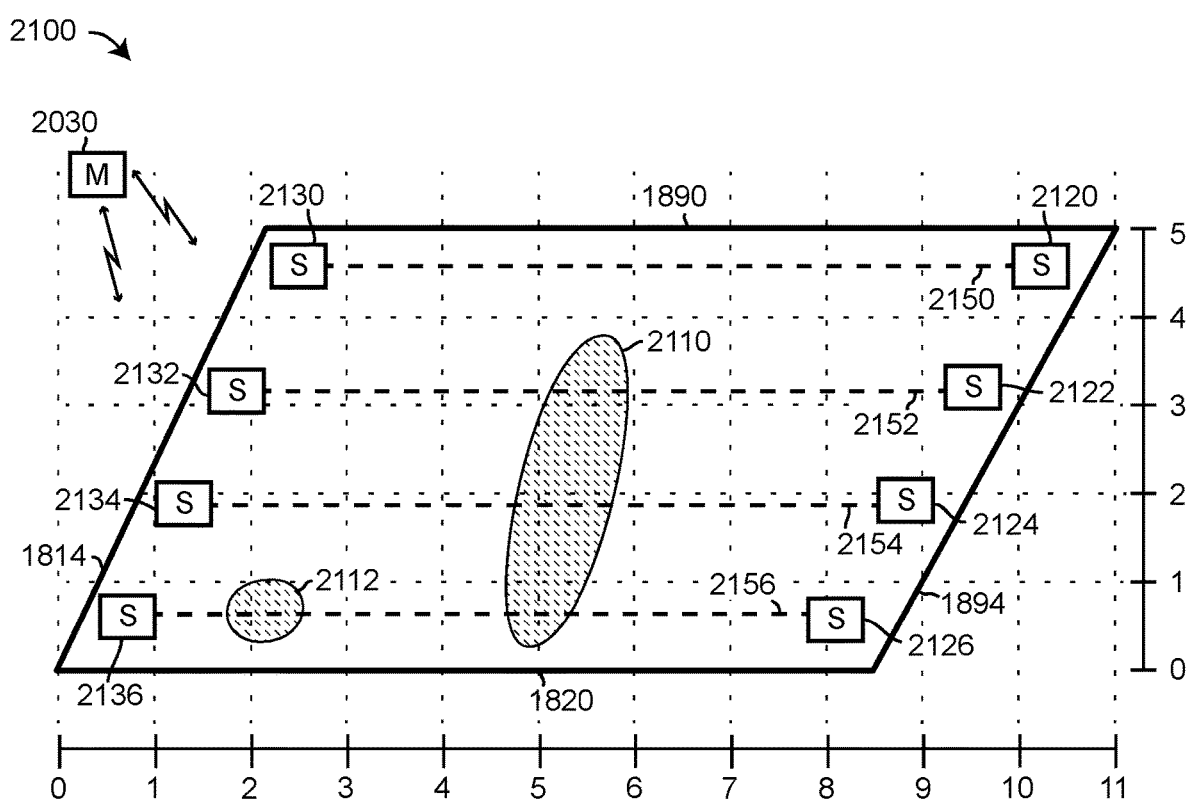
FIG. 21 is a plan view of another implementation of a moisture detector for a section of the roof of FIG. 19.

Configuration 2100, of FIG. 21, includes wire bundles 2150-2156 positioned on section 1820 only of roof 1802. Other sections of roof 1802 may have similar or different configurations of wire bundles and slave readers. Wire bundles 2150-2156 are electrically separate from each other and couple to independent slave readers on each end of the respective bundles. Wire bundles 2150-2156 span the length of section 1820 and are positioned a distance away from each other. Slave readers 2130-2136 couple to one side of wire bundles 2150-2156 respectively and slave readers 2120-2126 couple the other side of wire bundles 2150-2156 respectively. Slave readers 2120-2126 and slave readers 2130-2136 communicate with master reader 2140. A hierarchy may exist between slave readers 2120-2126 and 2130-2136 such that not all slave readers communicate directly with master reader 2140, but via another slave reader. Master reader 2140 communicates with all slave readers used in the moisture detection system of configuration 2100 either directly or indirectly.

With respect to configuration 2100, assume that leak 2110 is the only leak present in section 1820. Wire bundles 2151-2156 with slave readers 2132-2135 and 2122-2126 detect both the presence and extent (e.g., width, spread) of leak 2110. Slave readers 2132 and 2122 operate as discussed above to detect that liquid 2110 has reached wire bundle 2152. Further, slave readers 2132 and 2122 detect the left and right positions of leak 2110 with respect to wire bundle 2152. Slave reader 2134, slave reader 2124, and wire bundle 2154 detect the presence and extent of liquid 2110 as does slave reader 2136, slave reader 2126, and wire bundle 2156.

When slave readers 2120-2126 and 2130-2136 report their measured information to master reader 2030, master reader 2030 can detect the position and extent of leak 2110 if it assumes that the areas between bundles 2152 and 2156 also are wet from the leak because the liquid flowed down section 1820 from the higher portions, around bundle 2152, to the lower portions, around bundle 2156, which is likely based on the material used to make most roof surfaces and the inclination of the roof.

Multiple leaks may affect the ability of master reader 2140 to accurately determine the spread of liquid in section 1820; however because the number of electrically independent wire bundles in configuration 2100 is greater than the single wire bundle of configuration 2000, configuration 2100 may detect and report the presence and extend of leaks in a greater variety of situations than configuration 2000.

For example, assume that leak 2112 is present in section 1820 in addition to leak 2110. Slave reader 2126 will be able to determine the right most edge of leak 2110, but will not be able to detect leak 2112. Slave reader 2136 will be able to detect the left most edge of leak 2112, but will not be able to detect leak 2110. Base on the information detected by slave readers 2136 and 2126 with respect to leaks 2110 and 2112 as show in FIG. 21, master reader 2140 cannot detect the presence of two separate leaks. However, readers 2122 and 2124 can detect the right edge of leak 2110 and readers 2132 and 2134 can detect the left edge of leak 2110.

Master reader 2030 may include additional information that may be used to determine the likelihood that the information collected by readers 2126 and 2136 indicates two separate leaks as opposed to a long leak that extends horizontally along wire bundle 2156. Master reader 2030 may include information as to the probability that liquid in one square of roof 1820 as indicated by the horizontal and vertical grid will spread into another square of the grid.

For example, section 1820 is inclined so that ridge 1890 is higher, with respect to gravity, than the bottom portion of section 1820. So, a leak positioned in square 5 horizontal and 3 vertical is not likely to flow into square 1 horizontal and 0 vertical, but into squares 5 horizontal and 0-2 vertical. Using information regarding the likelihood of flow from one square to one or more other squares, master reader 2030 would be able to determine that the left edge of leak 2112 that was detected by slave reader 2136 likely is not the same leak as the right edge of leak 2110 detected by slave reader 2126, especially since slave readers 2132-2134 and 2122-2124 detected liquid in squares uphill from the right edge of leak 2110 as detected by slave reader 2126. It is not very likely that liquid from square horizontal 5 would flow over to square horizontal 2 especially when there is evidence of flow from square horizontal 5, vertical 3 down to horizontal 5, vertical zero.

In another implementation, reader 2136 may be electrically connected to the left ends of bundles 2150-2156 and reader 2126 may be electrically connected to the right ends of bundles 2150-2156 and the other readers 2130-2134 and 2120-2124 omitted. Master reader 2030 may control readers 2136 and 2126 so that the readers sequentially operate to detect liquid from each end of bundles 2150-2156.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

What is claimed is:

1. A method for determining a position of a liquid along a length of a conductor, the method performed by a reader, the reader coupled to a first end portion of a first conductor, a first end portion of a second conductor, and a first end portion of a third conductor respectively, the method comprising:

detecting a magnitude of a first resistance, the magnitude of the first resistance includes a magnitude of a resistance of a portion of the first conductor, a magnitude of a resistance of a liquid in contact with and bridging between the first conductor and the second conductor, a magnitude of resistance of a portion of the second conductor, the first conductor positioned proximate to the second conductor, a magnitude of an impedance of the first conductor different than a magnitude of an impedance of the second conductor;

detecting a magnitude of a second resistance, the magnitude of the second resistance includes the magnitude of the resistance of the portion of the second conductor, a magnitude of a resistance of the liquid in contact with and bridging between the second conductor and the third conductor, a magnitude of resistance of a portion of the third conductor, the third conductor positioned adjacent to the second conductor, the second conductor between the first and third conductors; and taking a difference between the magnitude of the first resistance and the magnitude of the second resistance to determine the position of the liquid relative to the first end portion of at least one of the conductors, wherein the first, second, and third conductors are positioned on a substrate of an absorbent pad adapted for use on hospital beds.

2. The method of claim 1 wherein detecting the magnitude of the first resistance comprises: applying a voltage across the first conductor and the second conductor; and responsive to applying the voltage, detecting a magnitude of a current that flows through the portion of the first conductor, the liquid between the first conductor and the second conductor, and the portion of the second conductor.

3. The method of claim 1 wherein detecting the magnitude of the first resistance comprises: providing a constant current through the portion of the first conductor, the liquid between the first conductor and the second conductor, and the portion of the second conductor; and responsive to providing the current, detecting a voltage between the first conductor and the second conductor.

4. The method of claim 1 wherein detecting the magnitude of the second resistance comprises: applying a voltage across the second conductor and the third conductor; and responsive to applying the voltage, detecting a magnitude of a current that flows through the portion of the second conductor, the liquid between the second conductor and the third conductor, and the portion of the third conductor.

5. The method of claim 1 wherein detecting the magnitude of the second resistance comprises: providing a constant current through the portion of the second conductor, the liquid between the second conductor and the third conductor, and the portion of the third conductor; and responsive to providing the current, detecting a voltage between the second conductor and the third conductor.

6. A method for determining a position of a liquid along a length of a conductor, the method performed by a reader, the reader coupled to a first end portion of a first conductor, a first end portion of a second conductor, and a first end portion of a third conductor respectively, the method comprising:
  detecting a first resistance, the first resistance includes a resistance of a portion of the first conductor, a resistance of the liquid in contact with and bridging between the first conductor and the second conductor, and a resistance of a portion of the second conductor, the first conductor positioned proximate to the second conductor, an impedance of the first conductor different than an impedance of the second conductor;
  detecting a second resistance, the second resistance includes the resistance of the portion of the second conductor, a resistance of the liquid in contact with and bridging between the second conductor and the third conductor, and a resistance of a portion of the third conductor, the third conductor positioned proximate to the second conductor; and
  taking a difference between the first resistance and the second resistance to determine the position of the liquid relative to the first end portion of at least one of the conductors, wherein the first, second, and third conductors are positioned on a substrate of an absorbent pad adapted for use on hospital beds.

7. The method of claim 6 wherein detecting the first resistance comprises: applying a voltage across the first conductor and the second conductor; and responsive to applying the voltage, detecting a current that flows through the portion of the first conductor, the liquid between the first conductor and the second conductor, and the portion of the second conductor.

8. The method of claim 6 wherein detecting the first resistance comprises: providing a constant current through the portion of the first conductor, the liquid between the first conductor and the second conductor, and the portion of the second conductor; and responsive to providing the current, detecting a voltage between the first conductor and the second conductor.

9. The method of claim 6 wherein detecting the second resistance comprises: applying a voltage across the second conductor and the third conductor; and responsive to applying the voltage, detecting a current that flows through the portion of the second conductor, the liquid between the second conductor and the third conductor, and the portion of the third conductor.

10. The method of claim 6 wherein detecting the second resistance comprises: providing a constant current through the portion of the second conductor, the liquid between the second conductor and the third conductor, and the portion of the third conductor; and responsive to providing the current, detecting a voltage between the second conductor and the third conductor.

11. A method for determining an area of a liquid relative to a length of at least one conductor, the method performed by a reader, the reader coupled to a first end portion and a second end portion of a first conductor, a first end portion of a second conductor, and a first end portion of a third conductor respectively, the method comprising:
  determining a first distance from a first end portion of at least one of the first conductor, the second conductor, and the third conductor to a position of the liquid in contact with and bridging between the first conductor, the second conductor, and the third conductor, a magnitude of an impedance of the first conductor different than a magnitude of an impedance of the second conductor, a length of each conductor is about the same;
  determining a second distance from a second end of at least one of the first conductor, the second conductor, and the third conductor to a position of the liquid in contact with and bridging between the first conductor, the second conductor, and the third conductor; and
  subtracting a sum of the first distance and the second distance from the length of any one of the conductors to determine the area of the liquid, wherein the first, second, and third conductors are positioned on a substrate of an absorbent pad adapted for use on hospital beds.

* * * * *